US012455674B2

(12) United States Patent
Zhou

(10) Patent No.: US 12,455,674 B2
(45) Date of Patent: Oct. 28, 2025

(54) MENU LIST UPDATE METHOD AND ELECTRONIC DEVICE

(71) Applicant: HUAWEI TECHNOLOGIES CO., LTD., Guangdong (CN)

(72) Inventor: Songle Zhou, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 26 days.

(21) Appl. No.: 18/238,071

(22) Filed: Aug. 25, 2023

(65) Prior Publication Data
US 2023/0400963 A1 Dec. 14, 2023

Related U.S. Application Data

(63) Continuation of application No. PCT/CN2022/072536, filed on Jan. 18, 2022.

(30) Foreign Application Priority Data

Feb. 27, 2021 (CN) .......................... 202110221598.7

(51) Int. Cl.
G06F 3/0482 (2013.01)
(52) U.S. Cl.
CPC ................................. G06F 3/0482 (2013.01)
(58) Field of Classification Search
CPC ..................................................... G06F 3/0482
See application file for complete search history.

(56) References Cited

U.S. PATENT DOCUMENTS

| 10,394,421 | B2* | 8/2019 | Akiner | G06V 30/412 |
| 2005/0144573 | A1* | 6/2005 | Moody | G06F 3/0481 715/810 |
| 2006/0115799 | A1* | 6/2006 | Stephen | G09B 15/06 434/185 |
| 2007/0067446 | A1* | 3/2007 | Jones | G06F 3/0482 709/224 |
| 2007/0208687 | A1* | 9/2007 | O'Conor | G06F 3/167 |

(Continued)

FOREIGN PATENT DOCUMENTS

| CN | 101623231 A | 1/2010 |
| CN | 105357742 A | 2/2016 |
| CN | 111078427 A | 4/2020 |

OTHER PUBLICATIONS

On the computer, Kugou Music how to add local music, (Oct. 20, 2018), [online]https://jingyan.baidu.com/article/922554466432dc851648f400.html, total 5 pages.

(Continued)

Primary Examiner — William L Bashore
Assistant Examiner — Gregory A Distefano
(74) Attorney, Agent, or Firm — WOMBLE BOND DICKINSON (US) LLP

(57) ABSTRACT

A menu list update method is provided. In the method, for an updated menu list, when an electronic device displays the menu list, a newly added menu in the menu list is always displayed after a focus menu. The technical solution provided in this application is implemented, so that the electronic device can quickly traverse the menu list. In this way, a visually impaired user can quickly find an expected menu. This improves user experience of the visually impaired user on the electronic device.

18 Claims, 27 Drawing Sheets

(56) References Cited

U.S. PATENT DOCUMENTS

2011/0286437 A1* 11/2011 Austin .............. H04M 15/8271
 370/338
2012/0116778 A1* 5/2012 Fleizach ............. G10L 13/0335
 704/271
2015/0365526 A1* 12/2015 Mihara ................. G06F 3/0485
 345/157
2018/0035365 A1* 2/2018 Koratekere Honnappa ................
 H04W 48/16

OTHER PUBLICATIONS

How to add local songs to Kugou Music, (Aug. 29, 2017), [online] https://jingyan.baidu.com/article/b87fe19e6961b652183568c7.html, total 7 pages.

* cited by examiner

MENU LIST UPDATE METHOD AND ELECTRONIC DEVICE

CROSS-REFERENCE TO RELATED APPLICATIONS

This application is a continuation of International Application No. PCT/CN2022/072536, filed on Jan. 18, 2022, which claims priority to Chinese Patent Application No. 202110221598.7, filed on Feb. 27, 2021. The disclosures of the aforementioned applications are hereby incorporated by reference in their entireties.

TECHNICAL FIELD

This application relates to the fields of terminals and communication technologies, and in particular, to a menu list update method and an electronic device.

BACKGROUND

With continuous improvement of accessibility functions of electronic devices by major manufacturers, more visually impaired users begin to use electronic devices. After the accessibility function is enabled, the electronic device may broadcast content displayed on a user interface. A user may obtain related information by listening to the broadcast content.

For a menu list on the user interface, the user may traverse the menu list in a manner of operating the electronic device, to obtain all content in the menu list. For example, the user obtains content displayed in a first menu of the menu list. The user may slide down the user interface to obtain content displayed in a second menu, and then slide down the user interface to obtain content displayed in a third menu. By analogy, the user may obtain all the content displayed in the menu list in a manner of operating the electronic device by sliding down the user interface.

In the conventional technology, for a menu list that can be updated, there are some newly added menus in the updated menu list. A newly added menu may be arranged in the middle of some menus that have been broadcast by the electronic device. It is assumed that the user needs to obtain the newly added menu. In this case, when the user continues to traverse the updated menu list in the manner of operating the electronic device by sliding down the user interface, some menus that have been broadcast by the electronic device are repeatedly broadcast. Consequently, the electronic device cannot quickly traverse the menu list, and the user has poor experience of using the electronic device.

SUMMARY

This application provides a menu list update method and an electronic device. After a menu list is updated, the electronic device can quickly traverse the menu list to find an expected menu, and this improves user experience on the electronic device.

According to a first aspect, this application provides a menu list update method. The method includes: An electronic device displays an old menu list; the electronic device updates the old menu list, to obtain a new menu list; the electronic device sets a focus menu in the new menu list based on a focus menu in the old menu list; and the electronic device displays the new menu list, where in the new menu list, a newly added menu is not displayed before the focus menu in the new menu list, and the newly added menu refers to a menu that does not exist in the old menu list but exists in the new menu list.

In the foregoing embodiment, when the menu list is updated, the newly added menu may be used as the focus menu, or may be displayed after the focus menu. The electronic device can quickly traverse these newly added menus. In this way, when the user traverses the updated menu list, all menus can be quickly traversed, and unnecessary repeated broadcast is not caused. A menu expected by a user is found, thereby improving user experience on the electronic device.

With reference to some embodiments of the first aspect, in some embodiments, that the electronic device displays the new menu list specifically includes: The electronic device displays the new menu list, and in the new menu list, a newly added menu sorted according to a service sorting rule is displayed after an available menu, and the available menu refers to a menu that exists in both the old menu list and the new menu list.

In the foregoing embodiment, the available menu is located in a front part of the new menu list, and the newly added menu is located in a rear part of the new menu list. The newly added menu is not displayed between menus that are broadcast by the electronic device. When the electronic device traverses these newly added menus, unnecessary repeated broadcast is not caused. In this way, the electronic device can quickly traverse the new menu list to find a menu expected by the user.

With reference to some embodiments of the first aspect, in some embodiments, the method further includes: The electronic device places an ordered newly-added list after an old available list to obtain the new menu list, where the old available list refers to a set of the available menus, and the ordered newly-added list refers to a set of newly added menus sorted according to the service sorting rule.

With reference to some embodiments of the first aspect, in some embodiments, when the focus menu in the old menu list is an unavailable menu, in the new menu list, both an available menu after the focus menu in the old menu list and a newly added menu sorted according to a service sorting rule are displayed after an available menu that is before the focus menu in the old menu list. When the focus menu in the old menu list is an available menu, in the new menu list, both an available menu after the focus menu in the old menu list and a newly added menu sorted according to a service sorting rule are displayed in the focus menu in the old menu list and after the available menu that is before the focus menu in the old menu list.

In the foregoing embodiment, the available menu after the focus menu in the old menu list and the newly added menu may be sorted together according to the service sorting rule. In this way, all menus after the focus menu in the new menu list look more orderly, and a menu expected by the user is more likely to be close to the focus menu. In this way, the electronic device can find the menu expected by the user more quickly.

With reference to some embodiments of the first aspect, in some embodiments, the method further includes: That the electronic device updates the old menu list, to obtain a new menu list includes: When the focus menu in the old menu list is an unavailable menu, the electronic device places an ordered post-focus list after a pre-focus old list, to obtain the new menu list, where the ordered post-focus list refers to a set including both the available menu after the focus menu in the old menu list and the newly added menu sorted according to the service sorting rule, and the pre-focus old list is a set of available menus before the focus menu in the old menu list. When the focus menu in the old menu list is an available menu, the electronic device places an ordered post-focus list after a pre-focus old list, to obtain the new menu list, where the ordered post-focus list refers to a set including both the available menu after the focus menu in the old menu list and the newly added menu sorted according to the service sorting rule, and the pre-focus old list refers to a set of the focus menu in the old menu list and available menus before the focus menu in the old menu list.

With reference to some embodiments of the first aspect, in some embodiments, that the electronic device displays the new menu list specifically includes: The electronic device displays the new menu list, and in the new menu list, both an available menu that is in the old menu list and that is not broadcast by the electronic device and a newly added menu sorted according to a service sorting rule are displayed after the available menu that is in the old menu list and that is already broadcast by the electronic device In the foregoing embodiment, in the new menu list, the menu that is broadcast by the electronic device is before the focus menu, and menus after the focus menu are menus that have not been broadcast by the electronic device. These menus that have not been broadcast by the electronic device are sorted according to the service sorting rule. In this way, the electronic device can quickly traverse the new menu list, and no repeated broadcast is caused, so that a menu expected by the user can be found more quickly, thereby improving user experience on using the electronic device.

With reference to some embodiments of the first aspect, in some embodiments, the method further includes: The electronic device places an ordered unbroadcast list after a broadcast old list, to obtain the new menu list, where the ordered unbroadcast list refers to a set including both the available menu that is in the old menu list and that is not broadcast by the electronic device and the newly added menu sorted according to the service sorting rule, and the broadcast old list refers to a set of available menus that are broadcast by the electronic device.

With reference to some embodiments of the first aspect, in some embodiments, that the electronic device sets a focus menu in the new menu list based on a focus menu in the old menu list specifically includes: When the electronic device determines that the focus menu in the old menu list is a non-unavailable menu, the electronic device sets the focus menu in the new menu list to be the same as the focus menu in the old menu list; or when the electronic device determines that the focus menu in the old menu list is an unavailable menu, and there is a non-unavailable menu after the focus menu in the old menu list, the electronic device sets a first non-unavailable menu after the focus menu in the old menu list as the focus menu in the new menu list; or when the electronic device determines that the focus menu in the old menu list is an unavailable menu, and there is no non-unavailable menu after the focus menu in the old menu list, the electronic device sets a first menu in the new menu list as the focus menu.

In the foregoing embodiment, the electronic device may set the focus menu in the new menu list based on whether there is an available menu after the focus menu in the old menu list. The electronic device may quickly set the focus menu in the new menu list, and in the new menu list, all focus menus broadcast by the electronic device are displayed before the focus menu. When the electronic device starts to broadcast the new menu list from the focus menu, the electronic device can traverse the new menu list more quickly.

With reference to some embodiments of the first aspect, in some embodiments, that the electronic device sets a focus menu in the new menu list based on a focus menu in the old menu list specifically includes: When the electronic device determines that the focus menu in the old menu list is an available menu, the electronic device sets the focus menu in the new menu list to be the same as the focus menu in the old menu list; or when the electronic device determines that the focus menu in the old menu list is an unavailable menu, and there is an available menu before the focus menu in the old menu list, the electronic device sets a first available menu before the focus menu in the old menu list as the focus menu in the new menu list; or when the electronic device determines that the focus menu in the old menu list is an unavailable menu, and there is no non-unavailable menu before the focus menu in the old menu list, the electronic device sets a first menu in the new menu list as the focus menu.

In the foregoing embodiment, the electronic device sets the focus menu in the new menu list based on whether there is an available menu before the focus menu in the old menu list. The electronic device may quickly set the focus menu in the new menu list, and in the new menu list, all focus menus broadcast by the electronic device are displayed before the focus menu. When the electronic device starts to broadcast the new menu list from the focus menu, the electronic device can traverse the new menu list more quickly.

With reference to some embodiments of the first aspect, in some embodiments, when the electronic device determines that the focus menu in the old menu list is an available menu, the electronic device sets the focus menu in the new menu list to be the same as the focus menu in the old menu list; or when the electronic device determines that the focus menu in the old menu list is an unavailable menu, and there is an available menu before the focus menu in the old menu list, the electronic device sets, in the new menu list, a first menu that is not before the focus menu in the old menu list as the focus menu; or when the electronic device determines that the focus menu in the old menu list is an unavailable menu, and there is no non-unavailable menu before the focus menu in the old menu list, the electronic device sets a first menu in the new menu list as the focus menu.

In the foregoing embodiment, the electronic device may set the focus menu in the new menu list based on whether there is an available menu before the focus menu in the old menu list. The electronic device may quickly set the focus menu in the new menu list, and in the new menu list, all focus menus broadcast by the electronic device are displayed before the focus menu. When the electronic device starts to broadcast the new menu list from the focus menu, the electronic device can traverse the new menu list more quickly.

With reference to some embodiments of the first aspect, in some embodiments, that the electronic device sets a focus menu in the new menu list based on a focus menu in the old menu list specifically includes: When the electronic device determines that the focus menu in the old menu list is an available menu, the electronic device sets the focus menu in the new menu list to be the same as the focus menu in the old menu list; or when the electronic device determines that the focus menu in the old menu list is an unavailable menu, and there is an available menu that is broadcast by the electronic device before the focus menu in the old menu list, the electronic device sets a first available menu that is broadcast by the electronic device before the focus menu in the old menu list as the focus menu in the new menu list; or when the electronic device determines that the focus menu in the old menu list is an unavailable menu, and there is no available menu that is broadcast by the electronic device before the focus menu in the old menu list, the electronic device sets a first menu in the new menu list as the focus menu.

In the foregoing embodiment, the electronic device may set the focus menu in the new menu list based on whether there is an available menu before the focus menu in the old menu list. The electronic device may quickly set the focus menu in the new menu list, and in the new menu list, all focus menus broadcast by the electronic device are displayed before the focus menu. When the electronic device starts to broadcast the new menu list from the focus menu, the electronic device can traverse the new menu list more quickly.

With reference to some embodiments of the first aspect, in some embodiments, that the electronic device sets a focus menu in the new menu list based on a focus menu in the old menu list specifically includes: When the electronic device determines that the focus menu in the old menu list is an available menu, the electronic device sets the focus menu in the new menu list to be the same as the focus menu in the old menu list; or when the electronic device determines that the focus menu in the old menu list is an unavailable menu, and there is an available menu that is broadcast by the electronic device before the focus menu in the old menu list, the electronic device sets, in the new menu list, a first menu that is not before the focus menu in the old menu list as the focus menu; or when the electronic device determines that the focus menu in the old menu list is an unavailable menu, and there is no available menu that is broadcast by the electronic device before the focus menu in the old menu list, the electronic device sets a first menu in the new menu list as the focus menu.

In the foregoing embodiment, the electronic device may set the focus menu in the new menu list based on whether there is an available menu before the focus menu in the old menu list. The electronic device may quickly set the focus menu in the new menu list, and in the new menu list, all focus menus broadcast by the electronic device are displayed before the focus menu. When the electronic device starts to broadcast the new menu list from the focus menu, the electronic device can traverse the new menu list more quickly.

With reference to some embodiments of the first aspect, in some embodiments, the method further includes: When the focus menu in the new menu list is not broadcast by the electronic device before the old menu list is updated, the electronic device automatically broadcasts the focus menu in the new menu list once; or when the focus menu in the new menu list is broadcast by the electronic device before the old menu list is updated, the electronic device does not automatically broadcast the focus menu in the new menu list.

In the foregoing embodiment, the electronic device does not automatically broadcast the focus menu that is broadcast by the electronic device, and this reduces unnecessary repeated broadcast. When the menu list is frequently updated, repeated broadcast may be avoided. The electronic device automatically broadcasts the focus menu that is not broadcast by the electronic device, to prevent the electronic device from missing broadcasting a menu.

With reference to some embodiments of the first aspect, in some embodiments, the method further includes: The electronic device automatically broadcasts the focus menu in the new menu list once.

In the foregoing embodiment, the electronic device does not need to determine whether the focus menu is broadcast by the electronic device, and directly sets to automatically broadcast the focus menu, to prevent the electronic device from missing broadcasting a focus menu.

With reference to some embodiments of the first aspect, in some embodiments, the method further includes: The electronic device does not automatically broadcast the focus menu in the new menu list.

In the foregoing embodiment, the electronic device does not need to determine whether the focus menu is broadcast by the electronic device, and directly sets not to automatically broadcast the focus menu, to reduce unnecessary repeated broadcast. When the menu list is frequently updated, a large quantity of repeated broadcast may be avoided.

According to a second aspect, an embodiment of this application provides an electronic device. The electronic device includes one or more processors and a memory. The memory is coupled to the one or more processors, the memory is configured to store computer program code, the computer program code includes computer instructions, and the one or more processors invoke the computer instructions, so that the first electronic device is enabled to execute: displaying an old menu list; updating the old menu list, to obtain a new menu list; setting a focus menu in the new menu list based on a focus menu in the old menu list; and displaying the new menu list, where in the new menu list, a newly added menu is not displayed before the focus menu in the new menu list, and the newly added menu refers to a menu that does not exist in the old menu list but exists in the new menu list.

In the foregoing embodiment, when the menu list is updated, the newly added menu may be used as the focus menu, or may be displayed after the focus menu. The electronic device can quickly traverse these newly added menus. In this way, when the user traverses the updated menu list, all menus can be quickly traversed, and unnecessary repeated broadcast is not caused. A menu expected by a user is found, thereby improving user experience on the electronic device.

With reference to some embodiments of the second aspect, in some embodiments, the displaying the new menu list specifically includes: displaying the new menu list, and in the new menu list, a newly added menu sorted according to a service sorting rule is displayed after an available menu, and the available menu refers to a menu that exists in both the old menu list and the new menu list.

With reference to some embodiments of the second aspect, in some embodiments, the updating the old menu list to obtain a new menu list includes: placing an ordered newly-added list after an old available list to obtain the new menu list, where the old available list refers to a set of the available menus, and the ordered newly-added list refers to a set of the newly added menus sorted according to the service sorting rule.

With reference to some embodiments of the second aspect, in some embodiments, when the focus menu in the old menu list is an unavailable menu, in the new menu list, both an available menu after the focus menu in the old menu list and a newly added menu sorted according to a service sorting rule are displayed after the available menu that is before the focus menu in the old menu list. When the focus menu in the old menu list is an available menu, in the new menu list, both an available menu after the focus menu in the old menu list and a newly added menu sorted according to a service sorting rule are displayed after the focus menu in the old menu list and an available menu that is before the focus menu in the old menu list.

With reference to some embodiments of the second aspect, in some embodiments, the updating the old menu list to obtain a new menu list includes: When the focus menu in the old menu list is the unavailable menu, placing an ordered post-focus list after a pre-focus old list, to obtain the new menu list, where the ordered post-focus list refers to a set including both the available menu after the focus menu in the old menu list and the newly added menu sorted according to the service sorting rule, and the pre-focus old list is a set of available menus before the focus menu in the old menu list. When the focus menu in the old menu list is the available menu, the electronic device places an ordered post-focus list after a pre-focus old list, to obtain the new menu list, where the ordered post-focus list refers to a set including both the available menu after the focus menu in the old menu list and the newly added menu sorted according to the service sorting rule, and the pre-focus old list refers to a set of the focus menu in the old menu list and available menus before the focus menu in the old menu list.

With reference to some embodiments of the second aspect, in some embodiments, the displaying the new menu list specifically includes: displaying the new menu list, and in the new menu list, both an available menu that is in the old menu list and that is not broadcast and a newly added menu sorted according to a service sorting rule are displayed after the available menu that is in the old menu list and that is already broadcast.

With reference to some embodiments of the second aspect, in some embodiments, the method further includes: placing an ordered newly-added list after an old available list to obtain the new menu list, where the old available list refers to a set of the available menus, and the ordered newly-added list refers to a set of the newly added menus sorted according to the service sorting rule.

With reference to some embodiments of the second aspect, in some embodiments, the method further includes: placing an ordered unbroadcast list after a broadcast old list, to obtain the new menu list, where the ordered unbroadcast list refers to a set including both an available menu that is in the old menu list and that is not broadcast by the electronic device and the newly added menu sorted according to a service sorting rule, and the broadcast old list refers to a set of the available menu that is broadcast by the electronic device.

With reference to some embodiments of the second aspect, in some embodiments, the setting a focus menu in the new menu list based on a focus menu in the old menu list specifically includes: when determining that the focus menu in the old menu list is a non-unavailable menu, setting the focus menu in the new menu list to be the same as the focus menu in the old menu list; or when determining that the focus menu in the old menu list is an unavailable menu, and there is a non-unavailable menu after the focus menu in the old menu list, setting a first non-unavailable menu after the focus menu in the old menu list as the focus menu in the new menu list; or when determining that the focus menu in the old menu list is an unavailable menu, and there is no non-unavailable menu after the focus menu in the old menu list, setting a first menu in the new menu list as the focus menu.

With reference to some embodiments of the second aspect, in some embodiments, the setting a focus menu in the new menu list based on a focus menu in the old menu list specifically includes: when determining that the focus menu in the old menu list is an available menu, setting the focus menu in the new menu list to be the same as the focus menu in the old menu list; or when determining that the focus menu in the old menu list is an unavailable menu, and there is an available menu before the focus menu in the old menu list, setting a first available menu before the focus menu in the old menu list as the focus menu in the new menu list; or when determining that the focus menu in the old menu list is an unavailable menu, and there is no non-unavailable menu before the focus menu in the old menu list, setting a first menu in the new menu list as the focus menu.

With reference to some embodiments of the second aspect, in some embodiments, the setting a focus menu in the new menu list based on a focus menu in the old menu list specifically includes: when determining that the focus menu in the old menu list is an available menu, setting the focus menu in the new menu list to be the same as the focus menu in the old menu list; or when determining that the focus menu in the old menu list is an unavailable menu, and there is an available menu before the focus menu in the old menu list, setting a first menu that is not before the focus menu in the old menu list as the focus menu in the new menu list; or when determining that the focus menu in the old menu list is an unavailable menu, and there is no non-unavailable menu before the focus menu in the old menu list, setting a first menu in the new menu list as the focus menu.

With reference to some embodiments of the second aspect, in some embodiments, the setting a focus menu in the new menu list based on a focus menu in the old menu list specifically includes: when determining that the focus menu in the old menu list is an available menu, setting the focus menu in the new menu list to be the same as the focus menu in the old menu list; or when determining that the focus menu in the old menu list is an unavailable menu, and there is an available menu that is broadcast before the focus menu in the old menu list, setting a first available menu that is broadcast before the focus menu in the old menu list as the focus menu in the new menu list; or when determining that the focus menu in the old menu list is an unavailable menu, and there is no available menu that is broadcast before the focus menu in the old menu list, setting a first menu in the new menu list as the focus menu.

With reference to some embodiments of the second aspect, in some embodiments, the setting a focus menu in the new menu list based on a focus menu in the old menu list specifically includes: when determining that the focus menu in the old menu list is an available menu, setting the focus menu in the new menu list to be the same as the focus menu in the old menu list; or when determining that the focus menu in the old menu list is an unavailable menu, and there is an available menu that is broadcast before the focus menu in the old menu list, setting, in the new menu list, a first menu that is not before the focus menu in the old menu list as the focus menu; or when determining that the focus menu in the old menu list is an unavailable menu, and there is no available menu that is broadcast before the focus menu in the old menu list, setting a first menu in the new menu list as the focus menu.

With reference to some embodiments of the second aspect, in some embodiments, the method further includes: When the focus menu in the new menu list has not been broadcast before the old menu list is updated, the focus menu in the new menu list is automatically broadcast once; or when the focus menu in the new menu list is broadcast before the old menu list is updated, the focus menu in the new menu list is not automatically broadcast.

With reference to some embodiments of the second aspect, in some embodiments, the method further includes: automatically broadcasting the focus menu in the new menu list once.

With reference to some embodiments of the second aspect, in some embodiments, the method further includes: The focus menu in the new menu list is not automatically broadcast.

According to a third aspect, an embodiment of this application provides an electronic device. The electronic device includes: a display module, configured to display an old menu list; an update module, configured to update the old menu list, to obtain a new menu list; a setting module, configured to set a focus menu in the new menu list based on a focus menu in the old menu list; and the display module is further configured to display the new menu list, and in the new menu list, a newly added menu is not displayed before the focus menu in the new menu list, where the newly added menu refers to a menu that does not exist in the old menu list but exists in the new menu list.

In the foregoing embodiment, when the menu list is updated, the newly added menu may be used as the focus menu, or may be displayed after the focus menu. The electronic device can quickly traverse these newly added menus. In this way, when the user traverses the updated menu list, all menus can be quickly traversed, and unnecessary repeated broadcast is not caused. A menu expected by a user is found, thereby improving user experience on the electronic device.

With reference to some embodiments of the third aspect, in some embodiments, that the display module is further configured to display the new menu list specifically includes: The display module displays the new menu list, and in the new menu list, newly added menus sorted according to a service sorting rule is displayed after an available menu, where the available menu refers to a menu that exists in both the old menu list and the new menu list.

With reference to some embodiments of the third aspect, in some embodiments, that the display module is further configured to display the new menu list specifically includes: The display module displays the new menu list. When the focus menu in the old menu list is an unavailable menu, in the new menu list, both an available menu after the focus menu in the old menu list and a newly added menu sorted according to a service sorting rule are displayed after an available menu that is before the focus menu in the old menu list. When the focus menu in the old menu list is an available menu, in the new menu list, both an available menu after the focus menu in the old menu list and a newly added menu sorted according to a service sorting rule are displayed in the focus menu in the old menu list and after the available menu that is before the focus menu.

With reference to some embodiments of the third aspect, in some embodiments, that the display module is further configured to display the new menu list specifically includes: The display module displays the new menu list, and in the new menu list, both an available menu that is in the old menu list and that is not broadcast and a newly added menu sorted according to a service sorting rule are displayed after the available menu that is in the old menu list and that is already broadcast by the electronic device.

With reference to some embodiments of the third aspect, in some embodiments, the setting module is configured to set a focus menu in the new menu list based on a focus menu in the old menu list specifically includes: When the setting module determines that the focus menu in the old menu list is a non-unavailable menu, the setting module sets the focus menu in the new menu list to be the same as the focus menu in the old menu list; or when the setting module determines that the focus menu in the old menu list is an unavailable menu, and there is a non-unavailable menu after the focus menu in the old menu list, setting a first non-unavailable menu after the focus menu in the old menu list as the focus menu in the new menu list; or when the setting module determines that the focus menu in the old menu list is an unavailable menu, and there is no non-unavailable menu after the focus menu in the old menu list, setting a first menu in the new menu list as the focus menu.

With reference to some embodiments of the third aspect, in some embodiments, the setting module is configured to set a focus menu in the new menu list based on a focus menu in the old menu list specifically includes: When the setting module determines that the focus menu in the old menu list is an available menu, setting the focus menu in the new menu list to be the same as the focus menu in the old menu list; or when the setting module determines that the focus menu in the old menu list is an unavailable menu, and there is an available menu before the focus menu in the old menu list, setting a first available menu before the focus menu in the old menu list as the focus menu in the new menu list; or when the setting module determines that the focus menu in the old menu list is an unavailable menu, and there is no non-unavailable menu before the focus menu in the old menu list, setting a first menu in the new menu list as the focus menu.

With reference to some embodiments of the third aspect, in some embodiments, the setting module is configured to set a focus menu in the new menu list based on a focus menu in the old menu list specifically includes: when the setting module determines that the focus menu in the old menu list is an available menu, setting the focus menu in the new menu list to be the same as the focus menu in the old menu list; or when the setting module determines that the focus menu in the old menu list is an unavailable menu, and there is an available menu before the focus menu in the old menu list, setting a first menu that is not before the focus menu in the old menu list as the focus menu in the new menu list; or when the setting module determines that the focus menu in the old menu list is an unavailable menu, and there is no non-unavailable menu before the focus menu in the old menu list, setting a first menu in the new menu list as the focus menu.

With reference to some embodiments of the third aspect, in some embodiments, the setting module is configured to set a focus menu in the new menu list based on a focus menu in the old menu list specifically includes: when the setting module determines that the focus menu in the old menu list is an available menu, setting the focus menu in the new menu list to be the same as the focus menu in the old menu list; or when the setting module determines that the focus menu in the old menu list is an unavailable menu, and there is an available menu that is broadcast before the focus menu in the old menu list, setting a first available menu that is broadcast before the focus menu in the old menu list as the focus menu in the new menu list; or when the setting module determines that the focus menu in the old menu list is an unavailable menu, and there is no available menu that is broadcast before the focus menu in the old menu list, setting a first menu in the new menu list as the focus menu.

With reference to some embodiments of the third aspect, in some embodiments, the setting module is configured to set a focus menu in the new menu list based on a focus menu in the old menu list specifically includes: when the setting module determines that the focus menu in the old menu list is an available menu, setting the focus menu in the new menu list to be the same as the focus menu in the old menu list; or when the setting module determines that the focus menu in the old menu list is an unavailable menu, and there is an available menu that is broadcast before the focus menu in the old menu list, setting, in the new menu list, a first menu that is not before the focus menu in the old menu list as the focus menu; or when the setting module determines that the focus menu in the old menu list is an unavailable menu, and there is no available menu that is broadcast before the focus menu in the old menu list, setting a first menu in the new menu list as the focus menu.

According to a fourth aspect, an embodiment of this application provides a chip system. The chip system is applied to an electronic device, the chip system includes one or more processors, and the processor is configured to invoke computer instructions, so that the electronic device performs the method described in any one of the first aspect and the possible implementations of the first aspect.

According to a fifth aspect, an embodiment of this application provides a computer program product including instructions. When the computer program product runs on an electronic device, the electronic device is enabled to perform the method described in any one of the first aspect and the possible implementations of the first aspect.

According to a sixth aspect, an embodiment of this application provides a computer-readable storage medium, including instructions. When the instructions are run on an electronic device, the electronic device is enabled to perform the method described in any one of the first aspect and the possible implementations of the first aspect.

It may be understood that the electronic device according to the second aspect and the third aspect, the chip system according to the fourth aspect, the computer program product according to the fifth aspect, and the computer storage medium according to the sixth aspect are all configured to perform the method provided in embodiments of this application. Therefore, for beneficial effects that can be achieved by the method, refer to beneficial effects in the corresponding method. Details are not described herein again.

DESCRIPTION OF EMBODIMENTS

Figure 1A:
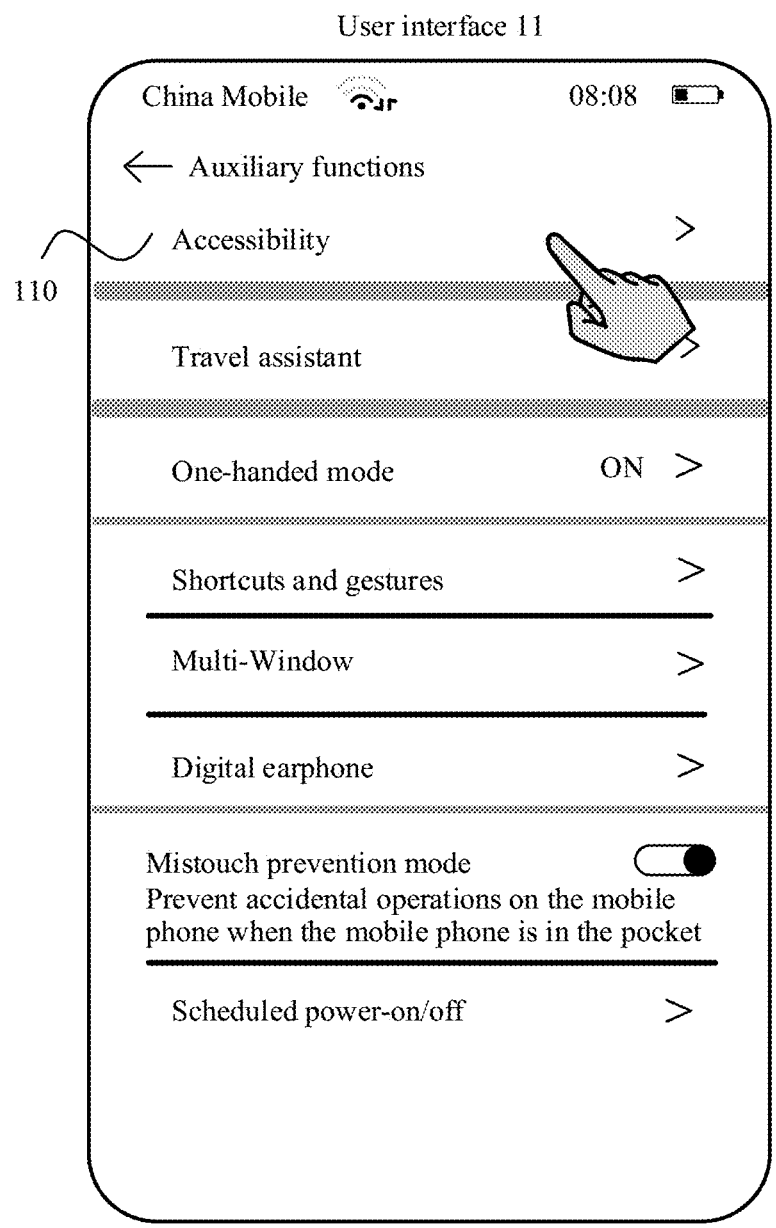
FIG. 1(a) and FIG. 1(b) are examples of user interfaces for enabling a screen reading function in an accessibility function of an electronic device according to an embodiment of this application.

Terms used in the following embodiments of this application are merely intended to describe example embodiments, but are not intended to limit this application. As used in the specification of this application and the appended claims, the singular expression "a", "an", "the", "the foregoing", "such a", or "this" is intended to also include a plural expression unless otherwise clearly indicated in the context. It should also be understood that the term "and/or" used in this application indicates and includes any or all possible combinations of one or more associated listed items.

The following terms "first" and "second" are merely intended for a purpose of description, and shall not be understood as an indication or implication of relative importance or implicit indication of a quantity of indicated technical features. Therefore, a feature limited by "first" or "second" may explicitly or implicitly include one or more features. In the descriptions of embodiments of this application, unless otherwise specified, "a plurality of" means two or more than two.

The term "user interface (UI)" in the following embodiments of this application includes a medium interface for interaction and information exchange between an application or an operating system and a user, and implements conversion between an internal form of information and a form that can be accepted by the user. The user interface is source code written in an example computer language such as Java or an extensible markup language (XML). The interface source code is parsed and rendered on an electronic device, and finally presented as content that can be identified by the user. The user interface is usually represented in a form of a graphical user interface (GUI), and is a user interface that is related to a computer operation and that is displayed in a graphic manner. The user interface may be a visual interface element such as a text, an icon, a button, a menu, a tab, a text box, a dialog box, a status bar, a navigation bar, or a Widget that is displayed on a display of the electronic device.

Because embodiments of this application relate to application of file protection between distributed collaboration devices, for ease of understanding, the following first describes related terms and concepts in embodiments of this application.

(1) Accessibility Function:

In embodiments of this application, the accessibility function is an interactive function that can enable an intention of a visually impaired user to be understood. The accessibility function can provide an electronic device with functions such as text-to-speech and screen reading.

When the screen reading function is enabled, the electronic device can broadcast content selected by the user on a current user interface. For example, when the user selects a text displayed in a control in the user interface, the electronic device can broadcast the text.

In some embodiments, the electronic device may alternatively prompt the user by voice how to perform an operation on selected content. For example, when the user selects a button in the user interface, the electronic device may notify the user how to operate the button by broadcasting: "The button may be executed by double-tapping with one finger".

Figure 1B:
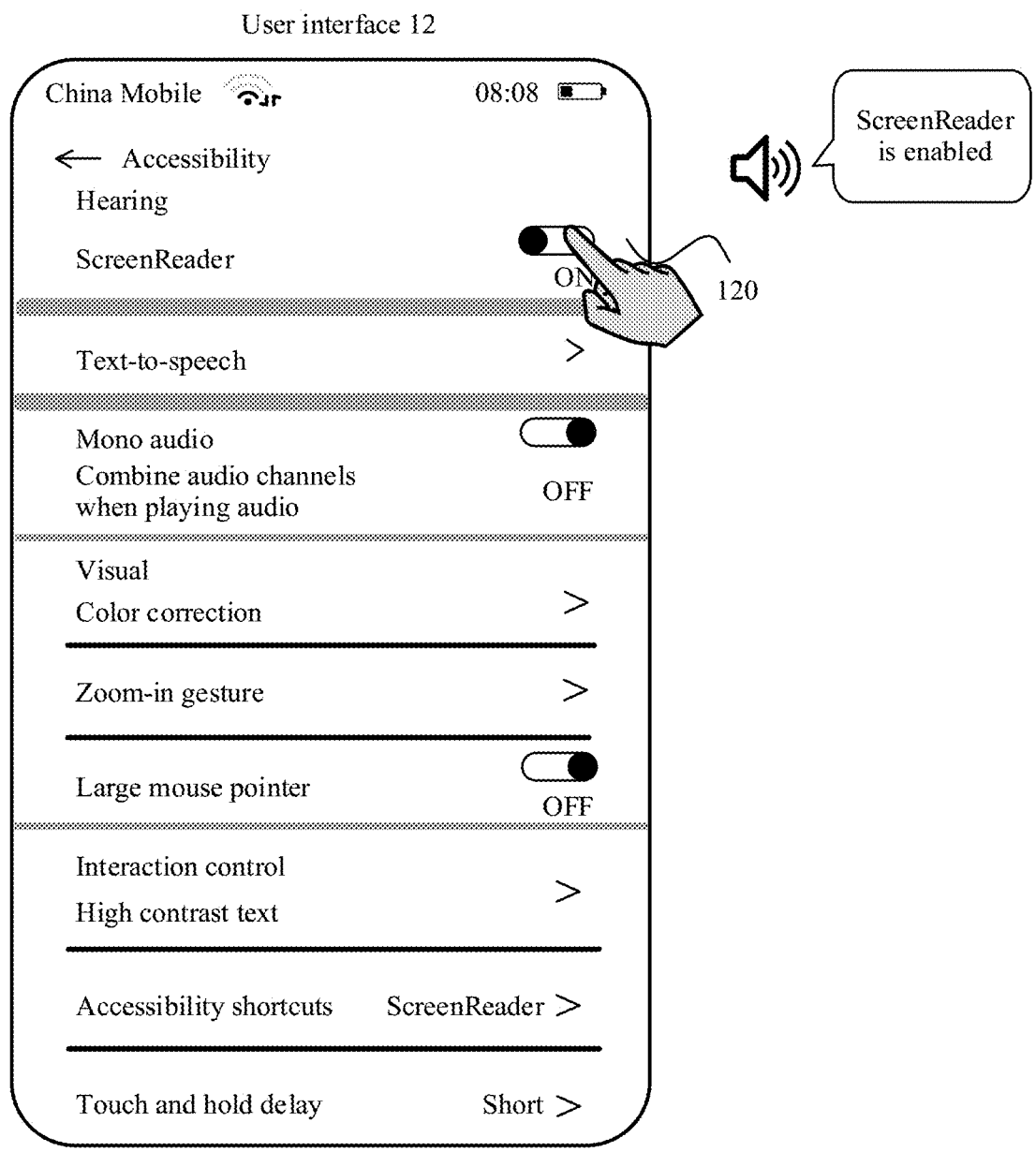

For example, FIG. 1(a) and FIG. 1(b) show examples of a user interface 11 and a user interface 12 in which an electronic device enables the screen reading function after entering the accessibility function. The user interface 11 and the user interface 12 may be provided by a "setting" application.

As shown in FIG. 1(a), the electronic device may display the user interface 12 shown in FIG. 1(b) in response to an operation (such as a tap operation) performed by the user on an accessibility function setting item 110 in the user interface 11.

As shown in FIG. 1(b), the user interface 12 is a setting interface of the accessibility function. In response to an operation (such as a tap operation) performed by the user on a screen reading switch control 120 in the user interface 12, the electronic device may enable screen reading. After the screen reading is enabled, the electronic device may interact with the user by broadcasting relevant content. For example, at this time, the electronic device may broadcast: "Screen-Reader is enabled".

It may be understood that the user interface 11 and the user interface 12 are merely a group of examples of user interfaces in which the electronic device performs broadcasting by using the screen reading function in the accessibility function. In some embodiments, the electronic device may alternatively enable the screen reading function by default for broadcasting. In some other embodiments, the electronic device may alternatively perform broadcasting by using another method. This is not limited herein.

(2) Menu List:

In embodiments of this application, the menu list includes one or more menus. The menu can be displayed in a control.

Each menu in a same menu list has a same display format. The same display format means that when the menu is displayed in the control, and when content is displayed in a same position of different controls, the content is of a same category, for example, an icon or a text.

Figure 2:
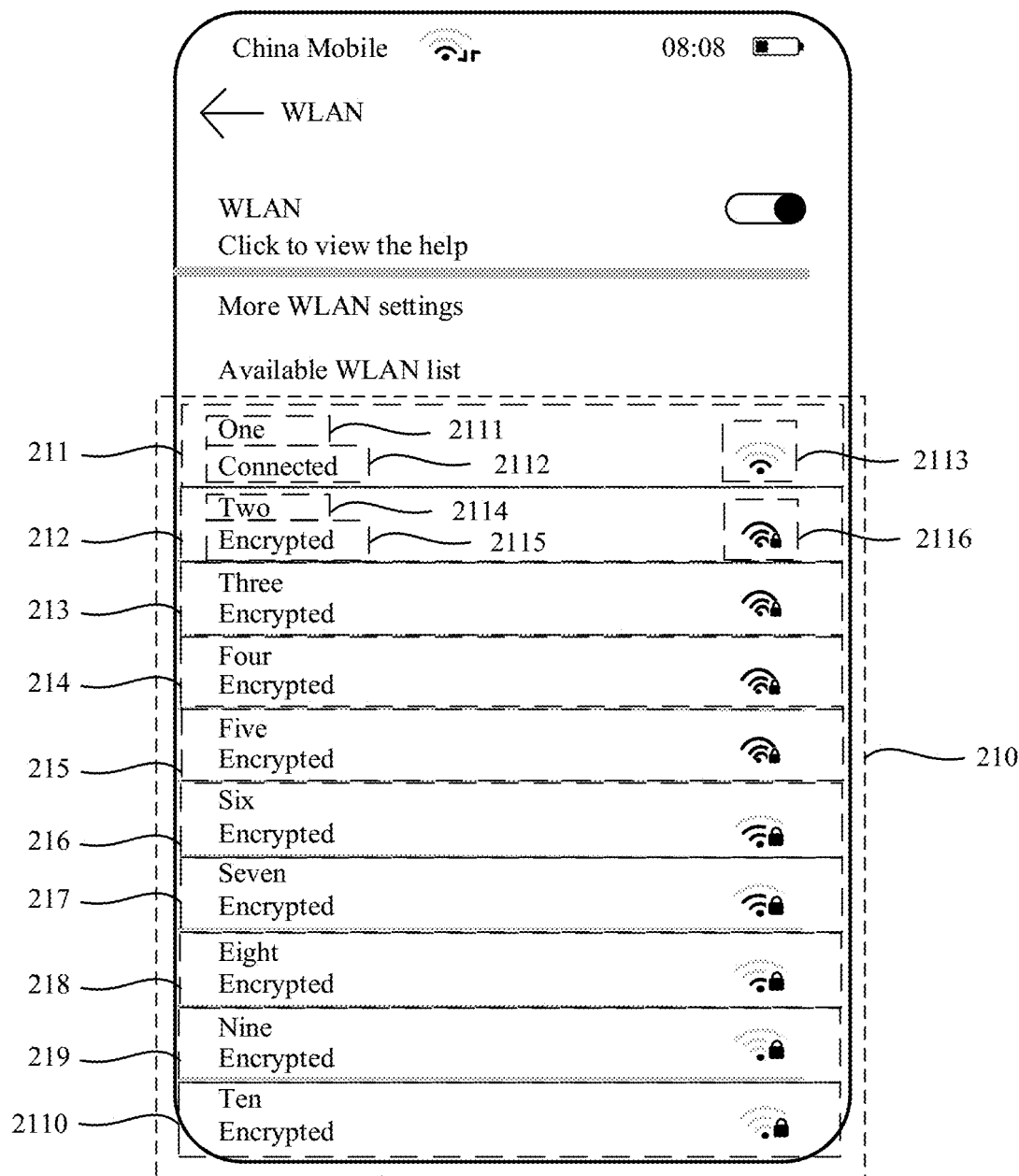
FIG. 2 is a schematic diagram of a menu list according to an embodiment of this application.

For example, FIG. 2 is a schematic diagram of a menu list according to an embodiment of this application.

As shown in FIG. 2, a menu list 210 is displayed in a user interface 21. Menus displayed in the user interface 21 in the menu list may be a menu 211 to a menu 2110 (included the listed items 211, 212, 213, . . . through 219 and 2110).

It may be understood that, in addition to the menu 211 to the menu 2110 that are already displayed in the user interface 21, the menus in the menu list 210 may further include another menu that is not displayed in the user interface 21. That is, all the menus that can be displayed in the user interface are content in the menu list.

Each menu has a same display format. For example, by comparing the menu 211 with the menu 212, it can be seen that:

Positions of an area 2111 and an area 2112 in a control that displays the menu 211 are the same as positions of an area 2114 and an area 2115 in a control that displays the menu 212. Content displayed in the two areas is both the text.

A position of an area 2113 in a control that displays the menu 211 is the same as a position of an area 2116 in a control that displays the menu 212. Content displayed in the two areas is both the icon.

(3) Focus Menu:

In embodiments of this application, the focus menu is a menu that is in the menu list and that is being broadcast by an electronic device or a menu that is not currently broadcast by an electronic device and that is broadcast by the electronic device once a broadcast condition is triggered. For example, the electronic device sets a menu A as the focus menu, but does not broadcast the menu A. In some embodiments, a tap operation performed by a user on the menu A may be used as a broadcast condition for triggering the menu A to be broadcast by the electronic device. That is, in response to the tap operation performed by the user on the menu A, the electronic device may broadcast the menu A. In some embodiments, a sliding operation performed by the user on the menu A may be used as a broadcast condition for triggering the menu A to be broadcast by the electronic device. In some other embodiments, the electronic device may alternatively use another operation as a broadcast condition for broadcasting the menu A by the electronic device. This is not limited herein.

The electronic device may enable the screen reading function in the accessibility function, so that the electronic device can broadcast the menu, or may enable the electronic device to broadcast the menu by using another method. This is not limited in this embodiment of this application.

Figure 3:
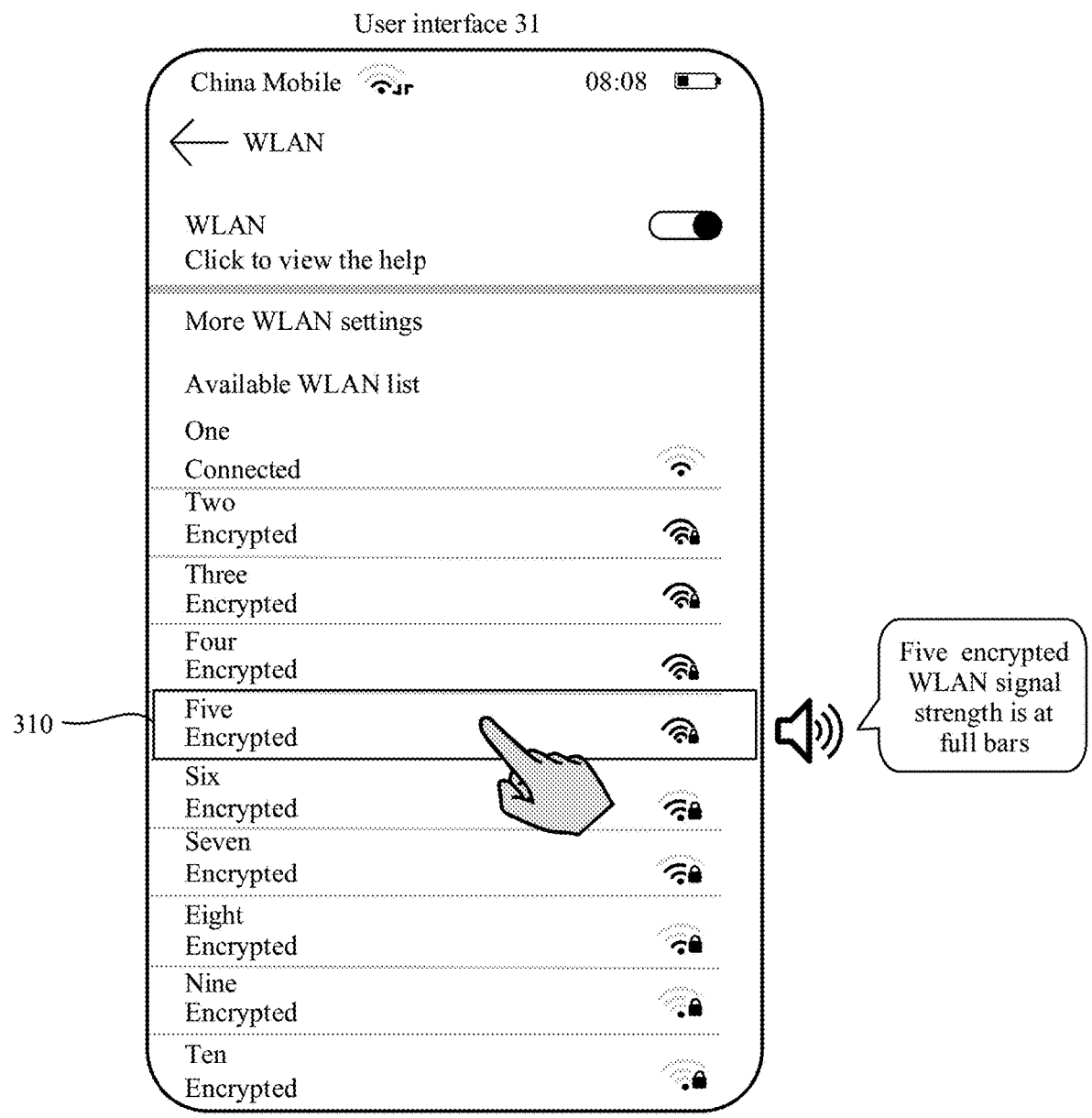
FIG. 3 is a schematic diagram in which a menu in a menu list becomes a focus menu according to an embodiment of this application.

For example, FIG. 3 is a schematic diagram in which a menu in a menu list becomes a focus menu in an embodiment of this application.

As shown in FIG. 3, a menu 310 is displayed in a user interface 31. In response to an operation (for example, a tap operation) performed by a user on the menu 310, the electronic device may broadcast the menu 310: "five encrypted WLAN signal strength is at full bars". In this case, the menu 310 is the focus menu.

The focus menu may be changed. In some embodiments, in response to an operation (for example, a slide-down operation) of changing the focus menu by the user, the electronic device may set a next menu of a current focus menu as the focus menu. In some other embodiments, in response to an operation (for example, a swipe-up operation) of changing the focus menu by the user, the electronic device may set a previous menu of a current focus menu as the focus menu. It may be understood that there is another manner of changing the focus menu. This is not limited in this embodiment of this application.

It may be understood that, when broadcasting the focus menu, the electronic device may alternatively broadcast other information in addition to the focus menu. For example, information such as which items in the menu list of the focus menu is located may alternatively be broadcast. This is not limited in this embodiment of this application.

To improve user experience of a visually impaired user on the electronic device, in one solution, the electronic device may broadcast the menu list, so that the user obtains information related to the menu list.

Figure 4A:
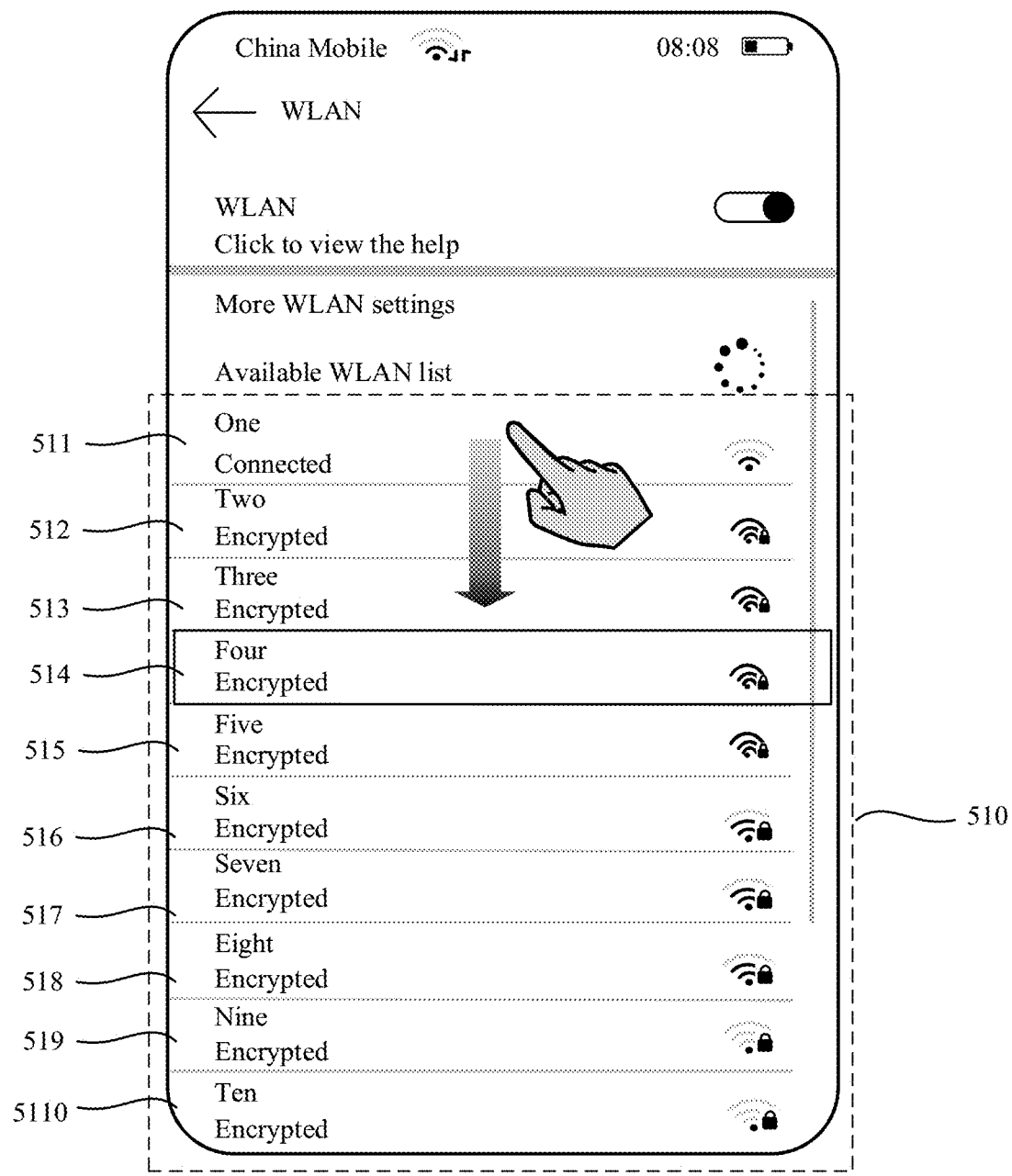
FIG. 4(a) and FIG. 4(b) are examples of a group of user interfaces for broadcasting a menu list by an electronic device in a solution.

As shown in FIG. 4(a), a user interface 51 may include a menu list 510, and all menus in the menu list include a menu 511 to a menu 5110. The menu list 510 may be provided by a "WLAN" application. It is assumed that a user traverses the menu list 510 starting from a first menu in a manner of sliding down the user interface, and has obtained information related to first three menus, that is, the menu 511 to the menu 513. When a fourth menu 514 in the menu list 510 is a focus menu, the electronic device starts to update the menu list 510.

Figure 5:
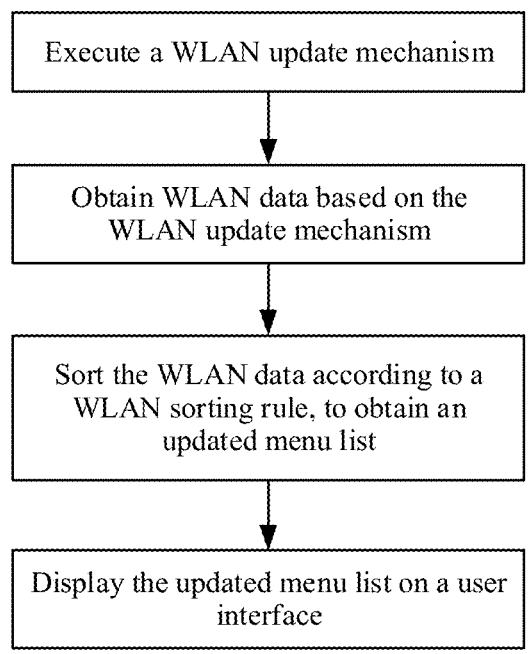
FIG. 5 is an example flowchart of updating a menu list in a solution.

In this case, the electronic device executes the procedure shown in FIG. 5, and may update the menu list 510. The electronic device first executes a WLAN update mechanism. Then, WLAN data is obtained based on the WLAN update mechanism. Next, the WLAN data is sorted according to a WLAN sorting rule, to obtain an updated menu list. For example, the sorting rule may be arranging unencrypted WLAN data after encrypted WLAN data, or the like. Finally, the updated menu list is displayed in the user interface.

Figure 4B:
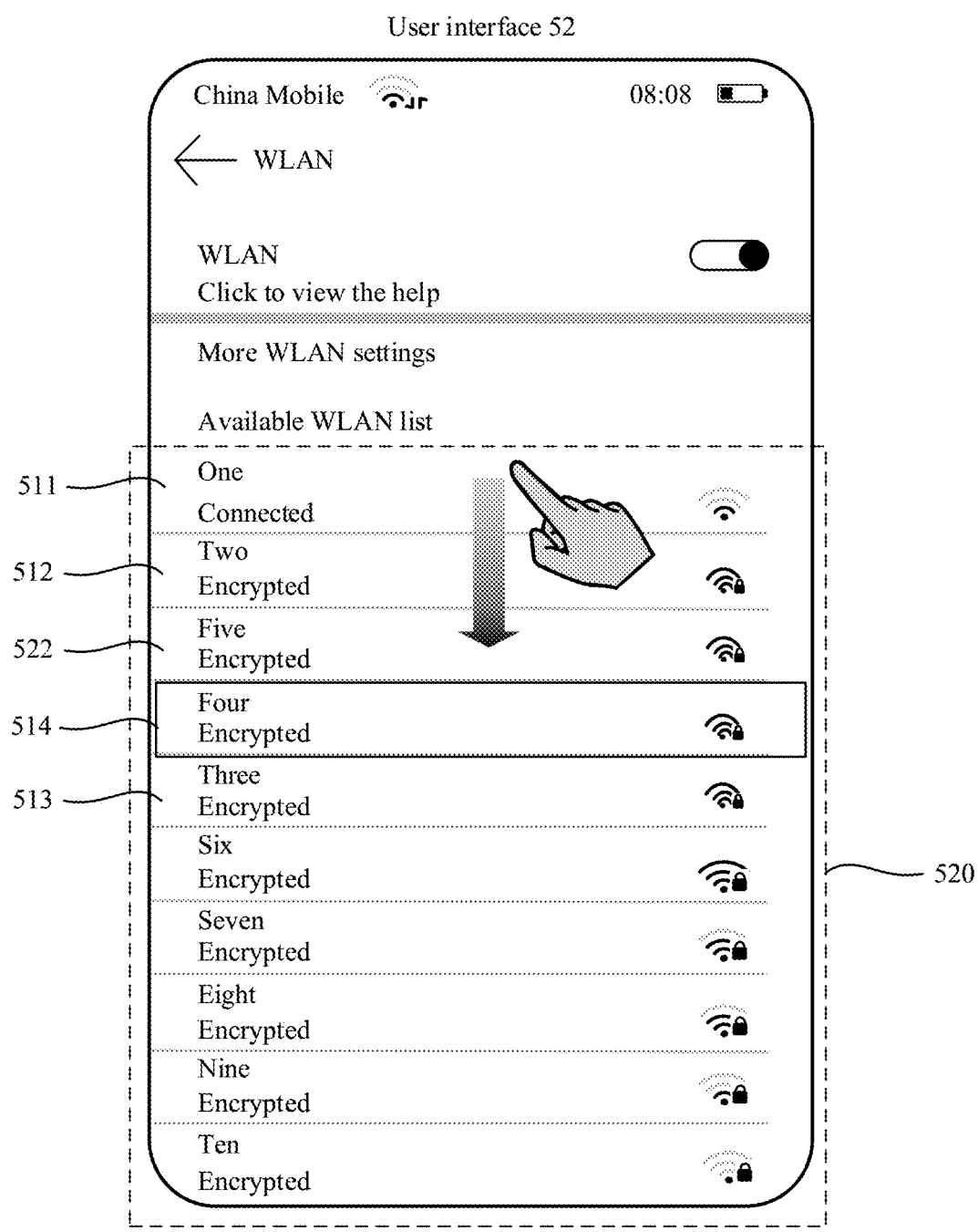

As shown in FIG. 4(b), the updated menu list may be a menu list 520 displayed in a user interface 52. Because a focus menu in the menu list 510 before updating is the fourth menu 514 in the menu list, the electronic device may continue to set a fourth menu 514 in the menu list 520 as the focus menu if a position of the focus menu in the menu list does not change or if the focus menu does not change. The user may continue to slide down the user interface to traverse menus following the menu 514.

It may be understood that, in this solution, a focus menu in an updated menu list 520 is the menu 514. A menu preceding the menu 514 may be a menu that has not been broadcast by the electronic device, for example, a menu 522, and the menu 522 exists in the middle of the menu 511, a menu 512, and the menu 514 that are broadcast by the electronic device. A menu following the menu 514 may have been broadcast by the electronic device, for example, the menu 513.

It is assumed that information that the user needs to obtain is information related to the menu 522, and at this time, the user continues to traverse the menu list in a manner of sliding down the user interface, the electronic device needs to repeatedly broadcast the menu 511, the menu 512, the menu 513, and the menu 514 before broadcasting the menu 522.

In this way, after the menu list is updated, if the user continues to traverse the menu list in the manner of sliding down the user interface, the electronic device repeatedly broadcasts, and the user cannot quickly traverse the menu list. Consequently, the user has a poor experience of using the electronic device.

However, by using the menu list update method provided in this embodiment of this application, after the menu list is updated, a visually impaired user can quickly traverse the menu list to find an expected menu, and this improves user experience on the electronic device.

By using the menu list update method in this embodiment of this application, for the menu list 510 in the user interface 51 shown in FIG. 4(a), it is assumed that the user traverses the menu list 510 in a manner of sliding down the user interface. The electronic device has broadcast the first three menus, and when the electronic device broadcasts the fourth menu 514, the menu list 510 is updated. After updating, a user interface 71 shown in FIG. 6(a) may be obtained.

Figure 6A:
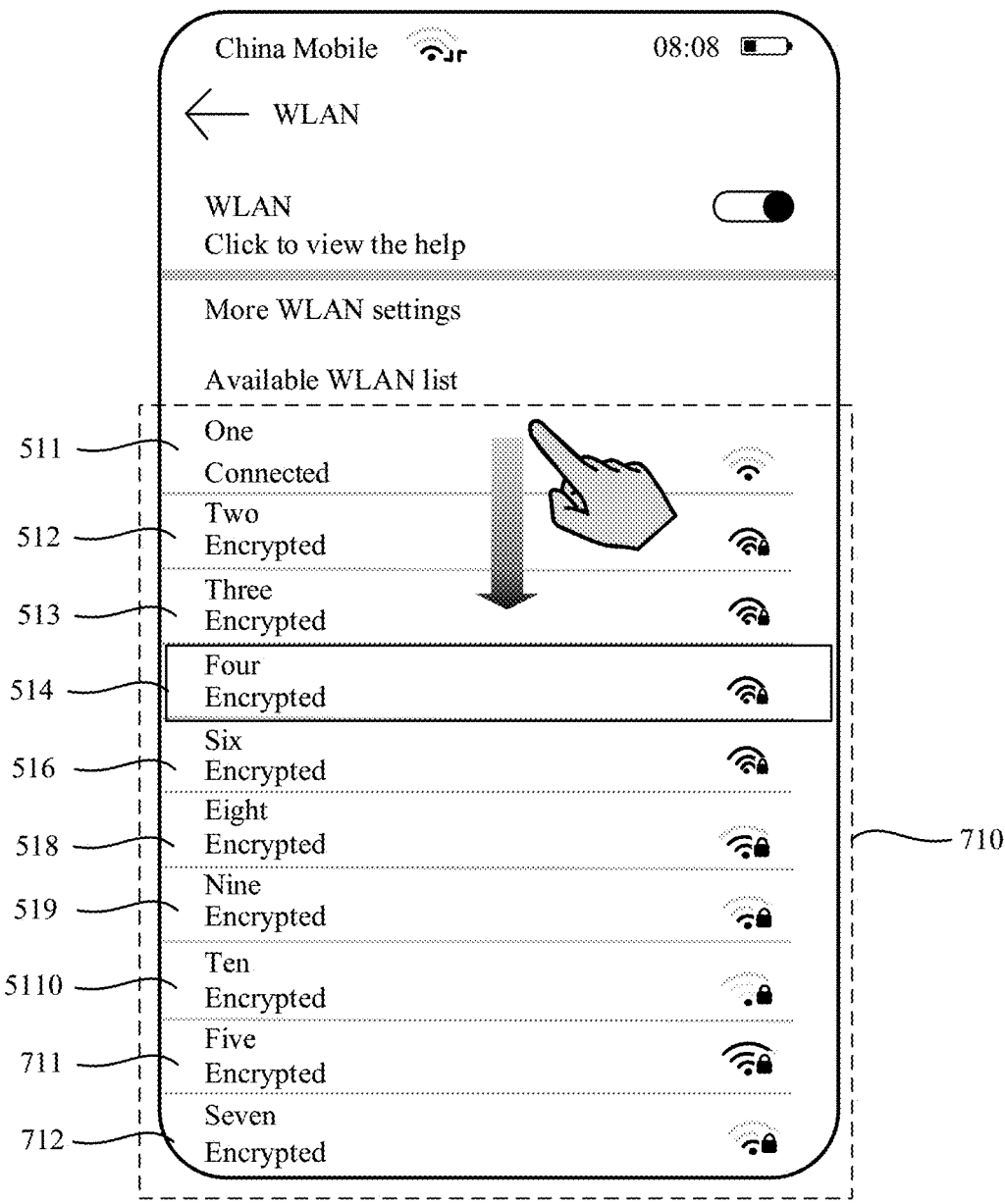
FIG. 6(a) and FIG. 6(b) are examples of a group of user interfaces in a menu list update method according to an embodiment of this application.

As shown in FIG. 6(a), the electronic device may set that a focus menu in a menu list 710 in the user interface 71 remains unchanged, and is still the fourth menu 514. Compared with the menu list 510 before updating, in the menu list 710, unavailable menus are a menu 515 and a menu 517. Available menus are a menu 512 to a menu 514, a menu 516, a menu 518 to a menu 5110, and newly added menus are a menu 711 and a menu 712. The electronic device does not display the unavailable menus in the menu list 710. A menu 511 to a menu 513 in the available menus may still be displayed before a focus menu 514. The menu 516, and the menus 518, 519, and 5110 are still displayed after the focus menu. Both the newly added menu 711 and the newly added menu 712 may be displayed after the focus menu 514.

It may be understood that the unavailable menu refers to a menu that exists in a menu list before updating but does not exist in a menu list after updating. The available menu refers to a menu that exists in both the menu list before and after updating. The newly added menu is a menu that does not exist in the menu list before updating but exists in the menu list after updating.

Figure 6B:
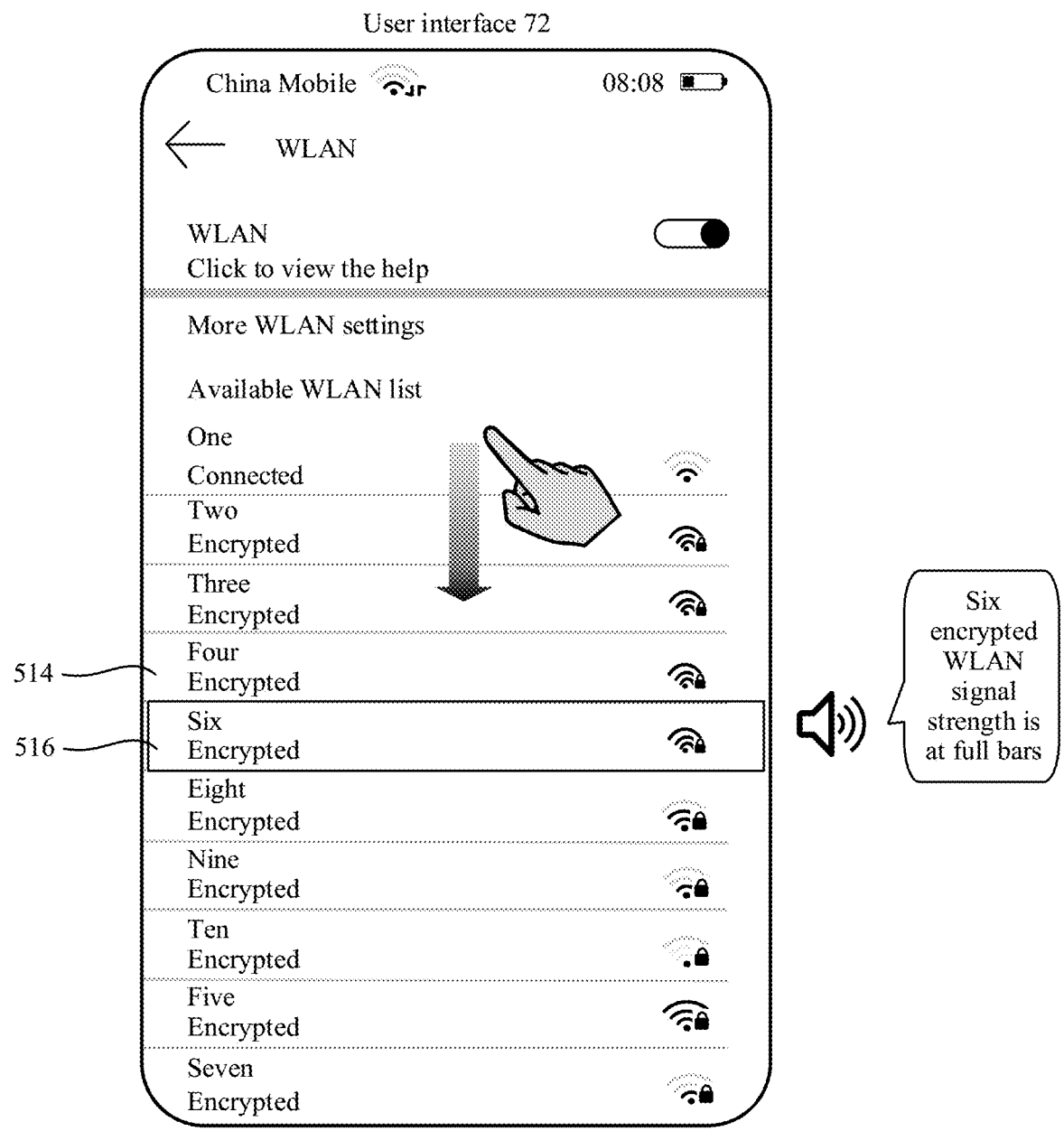

In response to an operation (for example, a slide-down operation) performed by the user in the user interface 71, the electronic device may display a user interface 72 shown in FIG. 6(b).

As shown in FIG. 6(b), in the user interface 72, the focus menu of the menu list 710 is a next menu 516 of the previous focus menu 514. The electronic device may broadcast the menu 516: "six encrypted WLAN signal strength is at full bars."

When the user continues to slide down the user interface, the focus menu may become a next menu of the menu 516, and the electronic device may broadcast the menu.

In this way, the user may continue to use a manner of sliding down the user interface, and the electronic device may sequentially broadcast a menu following the menu 516. This does not cause unnecessary repeat broadcasts.

It can be learned that the electronic device may quickly traverse the menu list 710 by using the menu list update method in this embodiment of this application. In this way, a visually impaired user can quickly find an expected menu, and this improves user experience of the visually impaired user on the electronic device.

When the menu list update method provided in this embodiment of this application is used to update an old menu list, different manners may be used to obtain different new menu lists.

Manner 1: Compared with the menu list before updating, the electronic device may use the available menu in an updated menu list as a front part of the updated menu list, sort the newly added menus according to a service sorting rule and place them after the available menu, to obtain the updated menu list.

Manner 2: For a menu that is in the available menu and that is before a focus menu (including the focus menu) in the menu list before updating, the electronic device may reserve a relative sequence of these menus in the menu list before updating, and place these menus in a front part of an updated menu list. The electronic device may sort, according to a service sorting rule, a menu that is in the available menu and that is after the focus menu in the menu list before updating and a newly added menu, and then use the menus as a rear part of the updated menu list, to obtain the updated menu list.

Manner 3: For a menu that is in the available menu and that is broadcast by the electronic device, the electronic device may reserve a relative sequence of these menus in the menu list before updating, and place these menus in a front part of an updated menu list. The electronic device may sort, according to a service sorting rule, a menu that is in the available menu and that is not broadcast by the electronic device together with a newly added menu, and then use the menus as a rear part of the updated menu list, to obtain the updated menu list.

With reference to the user interface shown in FIG. 1(a) and FIG. 1(b), the following describes, by using examples with reference to example application scenarios, a menu list update method provided in this embodiment of this application when the electronic device enables a screen reading function in an accessibility function.

Application scenario 1: When turning on a "WLAN" application, the electronic device may display a WLAN list. The WLAN list may be used as a menu list in this embodiment of this application. In the "WLAN" application, when detecting a new WLAN network, the electronic device may trigger update of a menu list.

The following describes a related user interface by using an example in which the electronic device updates the menu list in the manner 1 and broadcasts the menu list in the "WLAN" application in this application scenario.

FIG. 7a to FIG. 7e are examples of a group of user interfaces when a menu list in a "WLAN" application is updated.

For a first menu list displayed each time the electronic device turns on the "WLAN" application, the electronic device may sort a plurality of menus in the menu list according to a service sorting rule of the "WLAN" application. The service sorting rule may be that an unencrypted menu is placed before an encrypted menu, a menu with a strong network signal of "WLAN" in the unencrypted menu is placed before a menu with a weak signal, and a menu with high security is placed before a menu with low security if signal strength is the same. For a sorting rule of the encrypted menu, refer to a sorting rule of the unencrypted menu. Details are not described herein again.

It may be understood that, for a plurality of menus provided by the "WLAN" application, the electronic device may alternatively sort the plurality of menus by using another service sorting rule, to obtain a menu list. This is not limited herein.

Figure 7A:
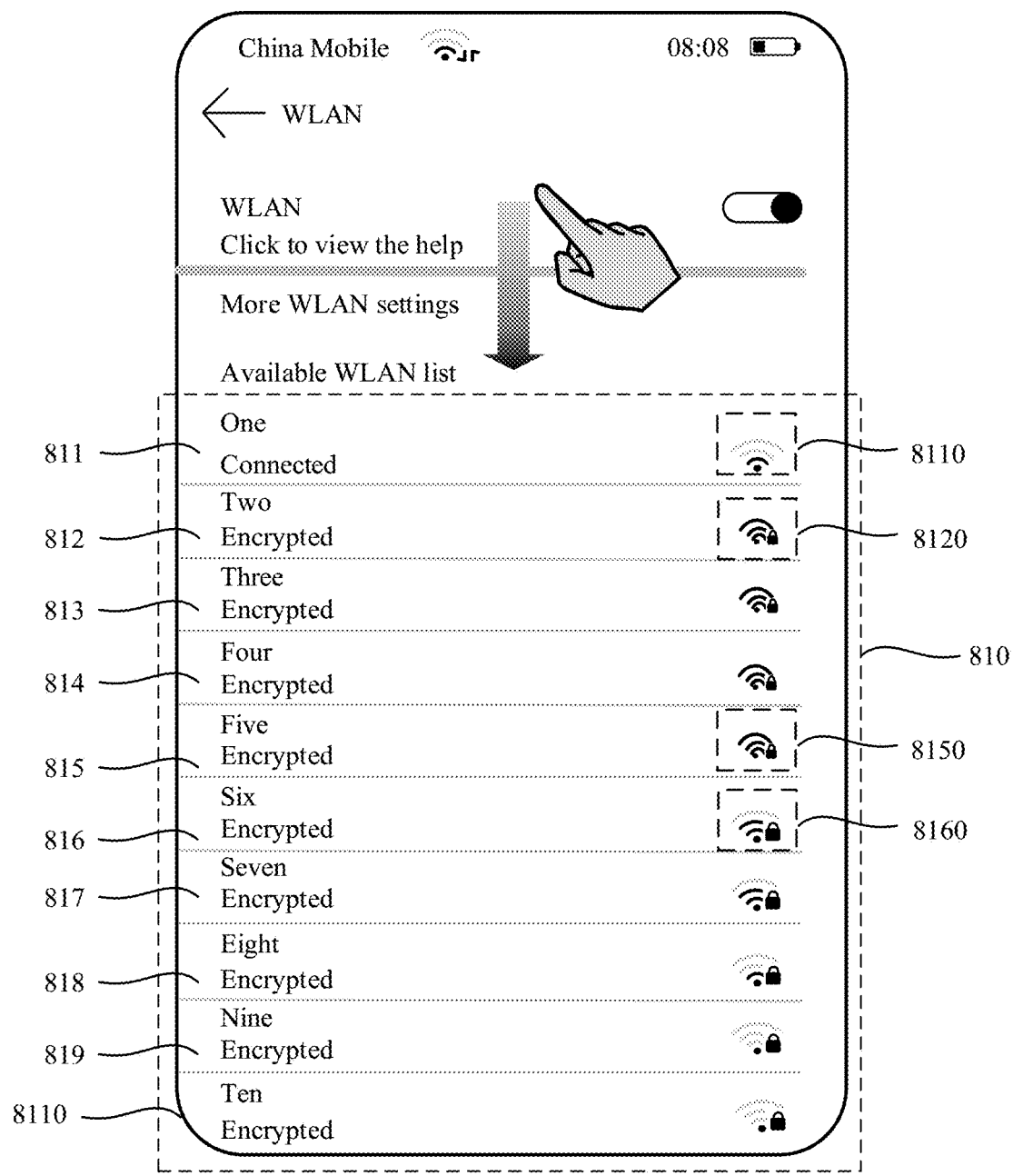
FIG. 7a to FIG. 7e are examples of a group of user interfaces when a menu list in a "WLAN" application is updated according to an embodiment of this application.

When the electronic device sorts the plurality of menus according to the foregoing service sorting rule of the "WLAN" application, for the obtained menu list, refer to a user interface 81 shown in FIG. 7a.

As shown in FIG. 7a, the user interface 81 may include a menu list 810, and the menu list 810 may be provided by a "WLAN" application. It is assumed that, in this case, all menus in the menu list 810 are displayed in the user interface 81, and all the menus may include a menu 811 to a menu 8110.

In the user interface 81, it can be seen from a comparison between a "WLAN" signal identifier 8110 provided by the menu 811 and a "WLAN" signal identifier 8120 provided by the menu 812 that, because a "WLAN" network provided by the menu 811 is not encrypted, but a "WLAN" network provided by the menu 812 is encrypted, the menu 811 is placed before the menu 812. It can be learned from a "WLAN" signal identifier 8150 provided by the menu 815 and a "WLAN" signal identifier 8160 provided by the menu 816 that, because a "WLAN" network signal provided by the menu 811 is stronger than a "WLAN" network signal provided by the menu 812, the menu 815 is placed before the menu 816.

In response to an operation (for example, a tap operation or a slide-down operation) performed by the user in the user interface 81, the electronic device may start to traverse the menu list 810. In this case, the electronic device may display a user interface 82 shown in FIG. 7b.

Figure 7B:
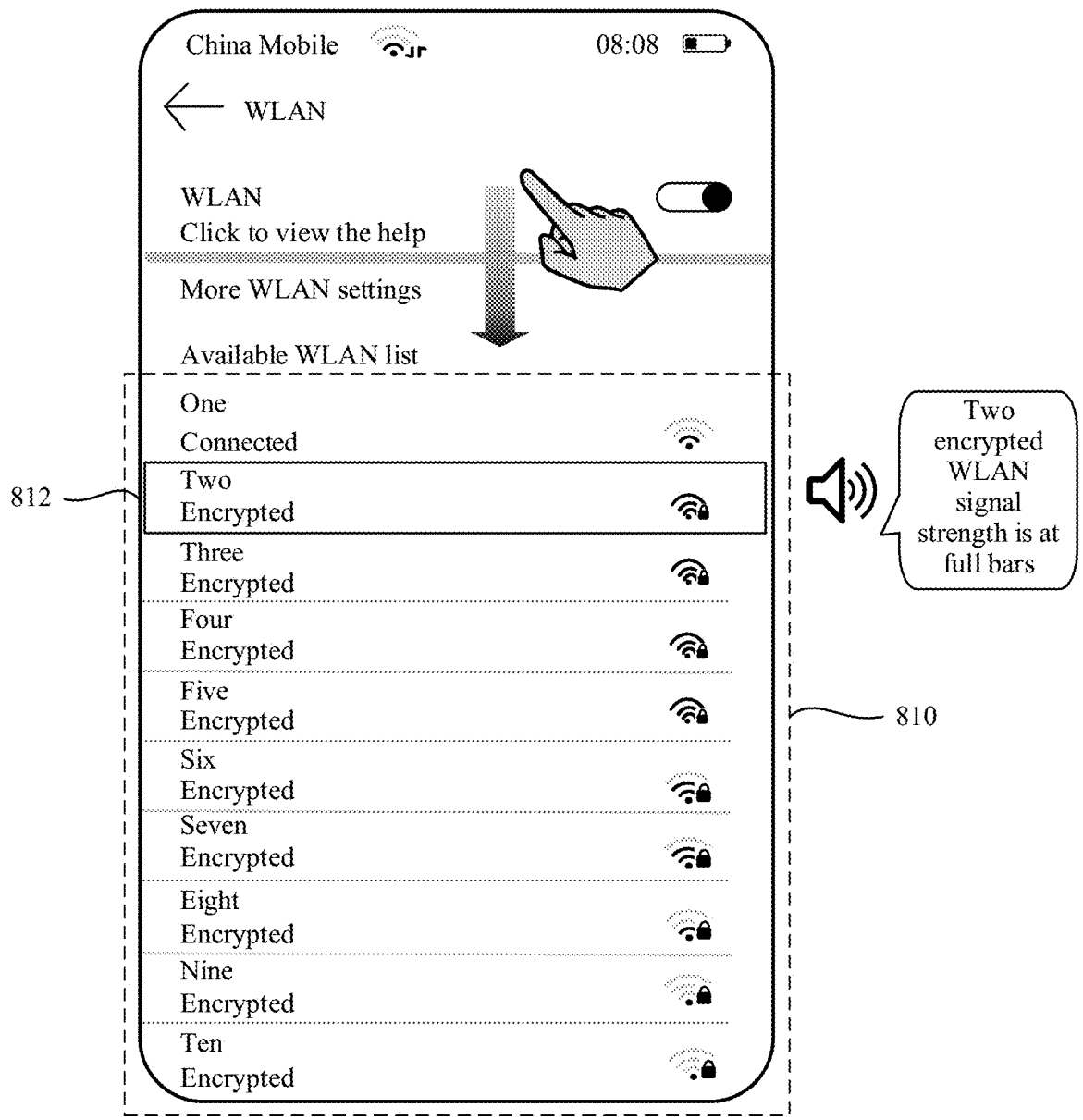

As shown in FIG. 7b, in the user interface 82, the electronic device sets a focus menu in a menu list 810 as a second menu 812. In this case, the electronic device may broadcast the menu 812: "two encrypted WLAN signal strength is at full bars."

The electronic device broadcasts the menu 812, and a user may obtain information related to the menu 812. Then, the user continues to operate the user interface. In response to an operation (for example, a slide-down operation) performed by the user in the user interface 82, the electronic device may continue to traverse the menu list 810. In this case, the electronic device may display a user interface 83 shown in FIG. 7c.

Figure 7C:
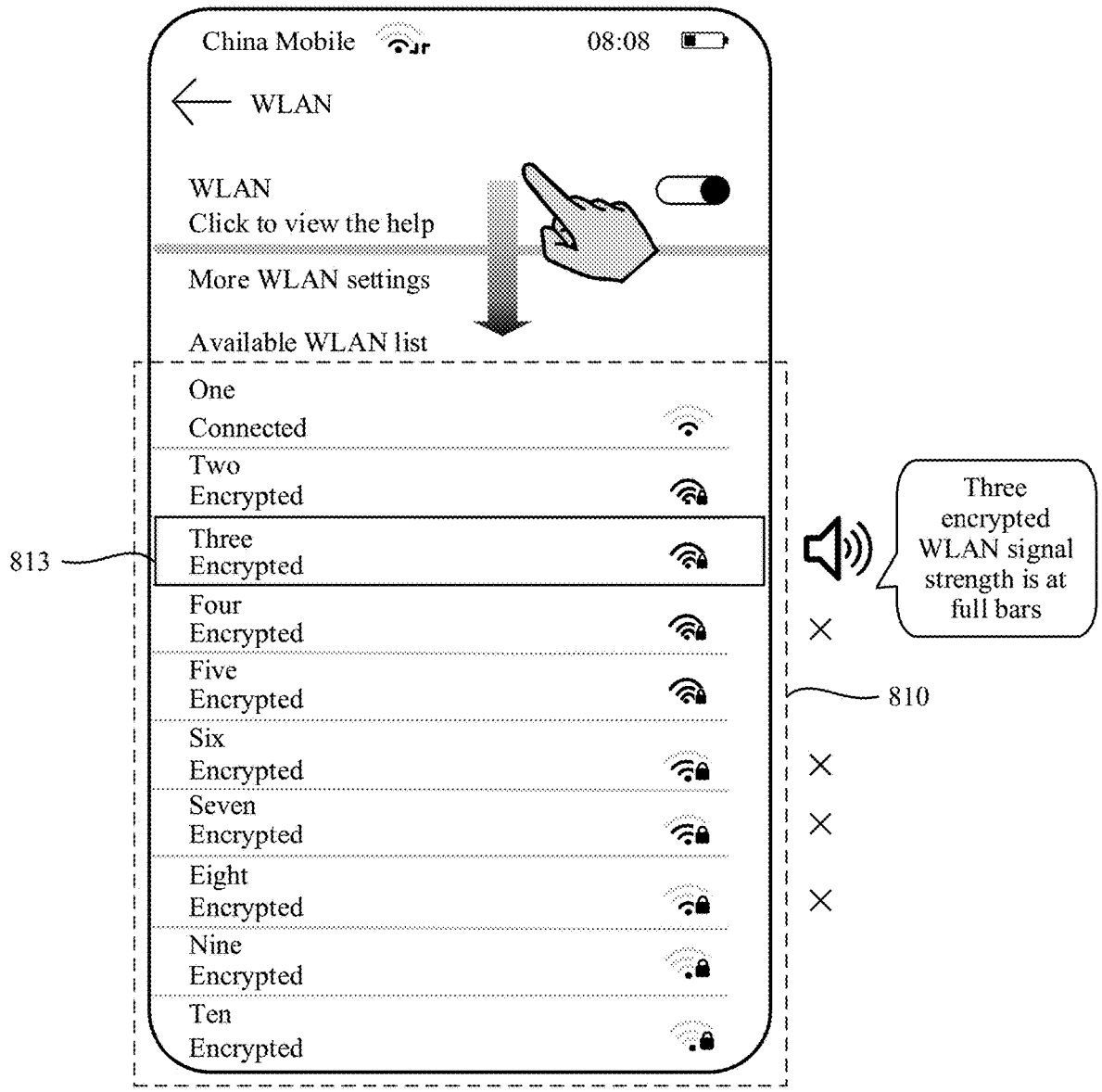

As shown in FIG. 7c, in the user interface 83, the focus menu of the menu list 810 changes from the second menu 812 to a third menu 813. In this case, the electronic device may broadcast the menu 813: "three encrypted WLAN signal strength is at full bars."

In this case, the electronic device detects a new WLAN network, and may update the menu list 810.

Figure 7D:
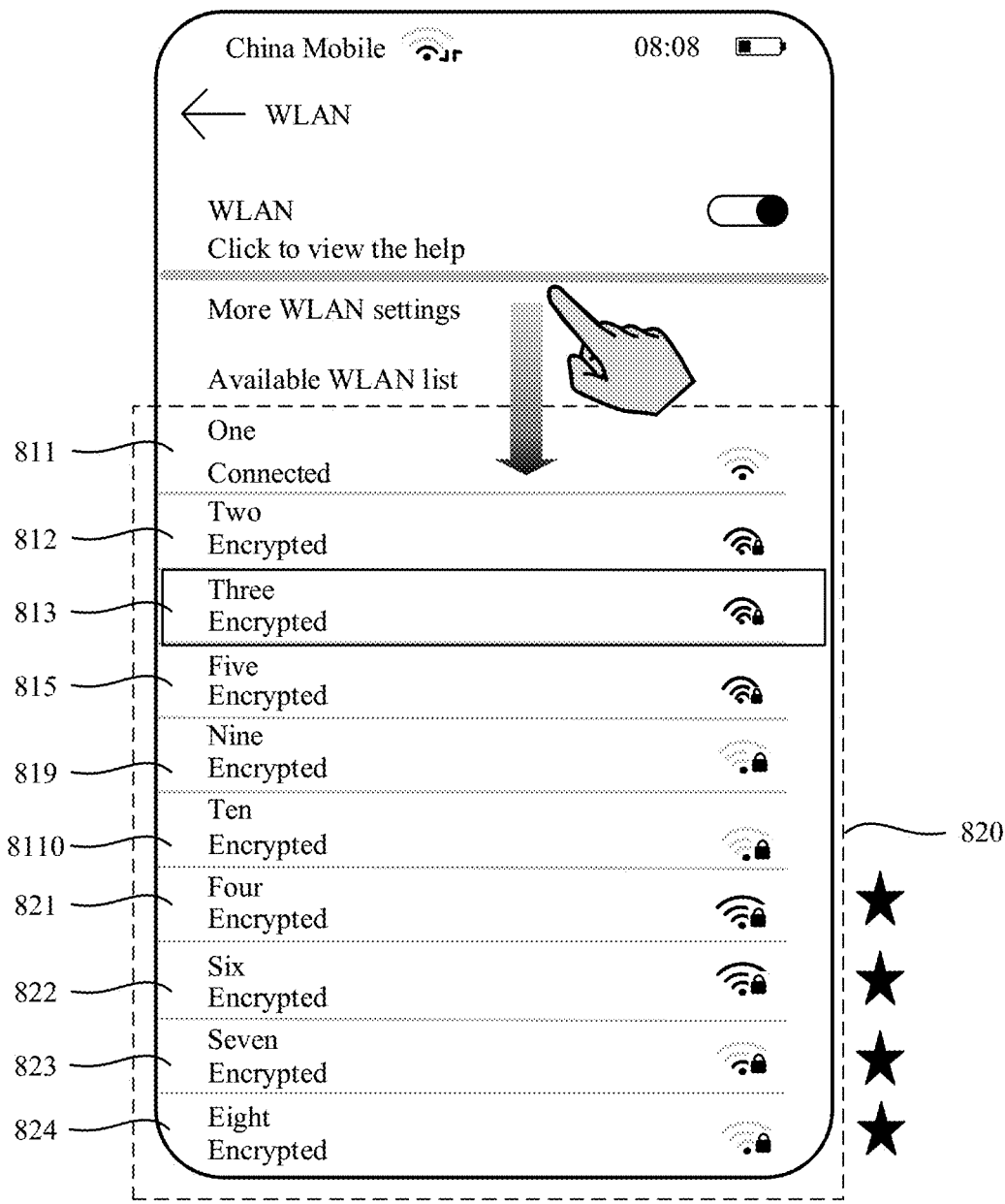

As shown in FIG. 7d, an updated menu list 820 may be displayed in a user interface 84. All menus in the menu list 820 are displayed in the user interface 84. Compared with the menu list 810, in the menu list 820, unavailable menus are a menu 814, a menu 816, a menu 817, and a menu 818. Available menus are a menu 811 to a menu 813, a menu 815, a menu 819 and a menu 8110, and newly added menus (including menus 821, 822, 823, and 824).

For a method for obtaining the menu list 820 by the electronic device, refer to the following description.

For available menus, the electronic device may use these menus as a front part of the menu list 820. These menus are sorted according to a service sorting rule of the "WLAN" application before being updated. The electronic device may reserve a relative sequence of these menus, and does not need to re-sort the menus. To be example, the electronic device may use the menu 811 to the menu 813, the menu 815, the menu 819, the menu 8110, and the newly added menu 821 to the newly added menu 824 as a front part of the menu list 820.

For the newly added menu 821 to the newly added menu 824, the electronic device may sort these menus according to a service sorting rule of the "WLAN" application, and use these menus as a rear part of the menu list. That is, the electronic device may place these menus after the available menu, to obtain the menu list 820.

Because the focus menu in the menu list 810, that is, the menu 813, still exists in the menu list 820, the electronic device may set that the focus menu does not change. In the menu list 820, the focus menu is still the menu 813.

In this embodiment of this application, both a focus menu in the updated menu list 820 and the focus menu in the menu list 810 before updating are the menu 813. To prevent the focus menu from being repeatedly broadcast due to frequent updates of the menu list, the electronic device may not automatically broadcast the menu 813.

In some embodiments, although the menu 813 is broadcast by the electronic device, to prompt the user that a current menu list has been updated, the electronic device may automatically broadcast the focus menu once: "three encrypted WLAN signal strength is at full bars".

The update of the menu list does not affect the user's quick traversal of the menu list, and the user may continue to operate the user interface to obtain information related to a next menu of a current focus menu. In response to an operation (for example, a slide-down operation) performed by the user in the user interface 84, the electronic device may start to traverse the menu list 820. In this case, the electronic device may display a user interface 85 shown in FIG. 7e.

Figure 7E:
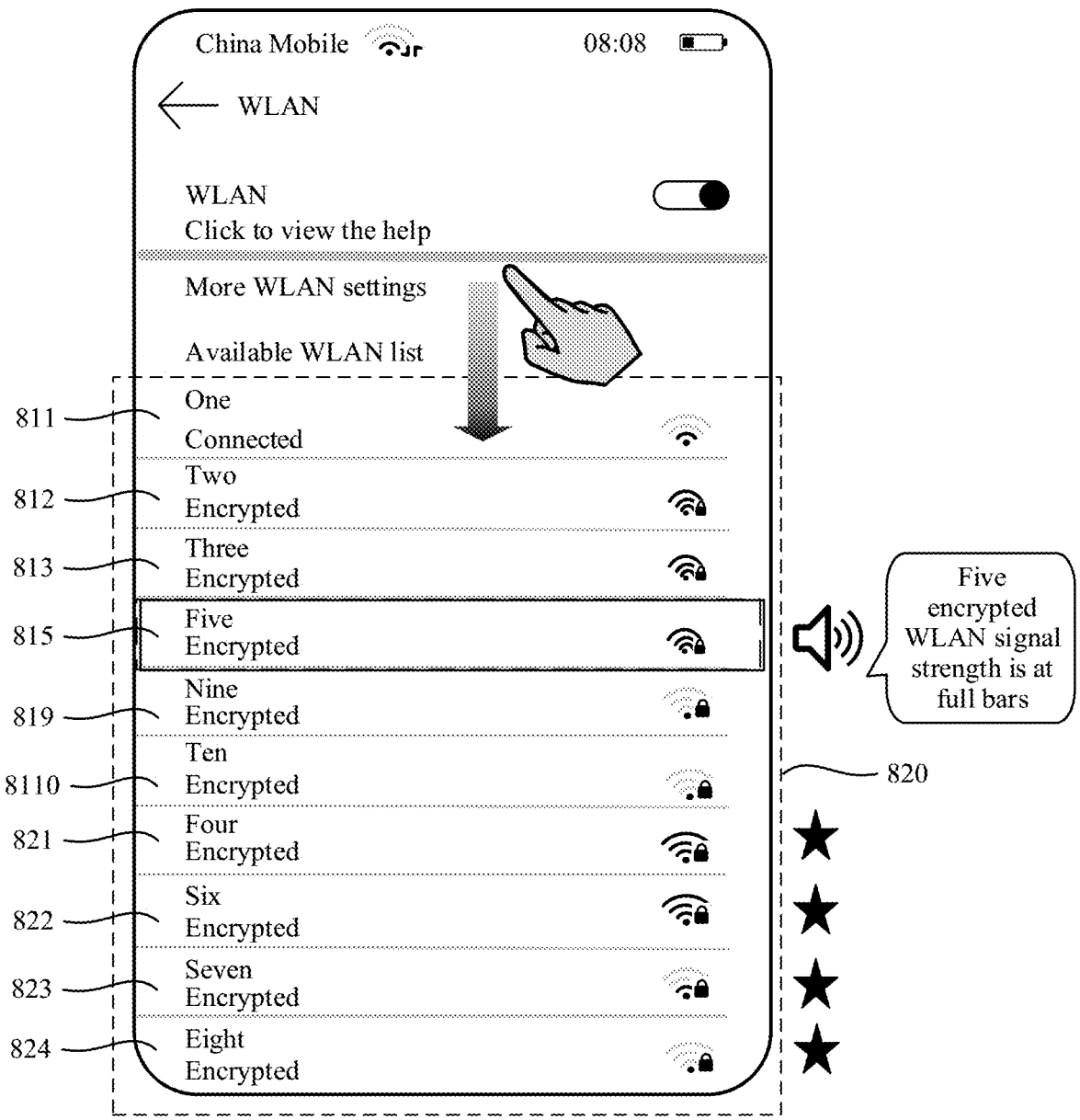

As shown in FIG. 7e, in the user interface 85, the focus menu of the menu list 810 changes from the third menu 813 to a fourth menu 815. In this case, the electronic device may broadcast the menu 815: "five encrypted WLAN signal strength is at full bars."

After obtaining information related to the menu 815, the user may continue to operate the user interface to obtain information related to a next menu until information related to a menu required by the user is obtained.

In this way, no menu that has not been traversed exists among the menus that have been traversed. When obtaining information related to a menu that has not been traversed, the user does not undergo a process of repeatedly traversing a same menu for a plurality of times, and the menu list can be quickly traversed, thereby improving user experience on using the electronic device.

Application scenario 2: When turning on a communication application, the electronic device may display a message list. The message list may be used as a menu list in this embodiment of this application. In the communication application, when receiving a new message, the electronic device may trigger update of a menu list. The electronic device may broadcast the menu list by using the menu list update method provided in this embodiment of this application.

The following describes a related user interface by using an example in which the electronic device updates the menu list in the manner 2 and broadcasts a menu list in a communication application in this application scenario.

FIG. 8a to FIG. 8d are examples of a group of user interfaces when a menu list in a communication application is updated.

For a first menu list displayed each time the electronic device turns on the communication application, the electronic device may sort a plurality of menus in the menu list according to a service sorting rule of the communication application. The service sorting rule may be sorting according to timestamps corresponding to the plurality of menus. A latter timestamp of a menu indicates a higher priority of the menu in the menu list. A timestamp of a menu refers to time at which the electronic device obtains the menu.

It may be understood that, for a plurality of menus provided by the communication application, in addition to sorting according to timestamps, the electronic device may alternatively sort the plurality of menus by using different service sorting rules, to obtain the menu list. This is not limited herein.

When the electronic device sorts the plurality of menus according to the service sorting rule that a latter timestamp of a menu indicates a higher priority of the menu in the menu list. For an obtained menu list, refer to a user interface 91 shown in FIG. 8a.

Figure 8A:
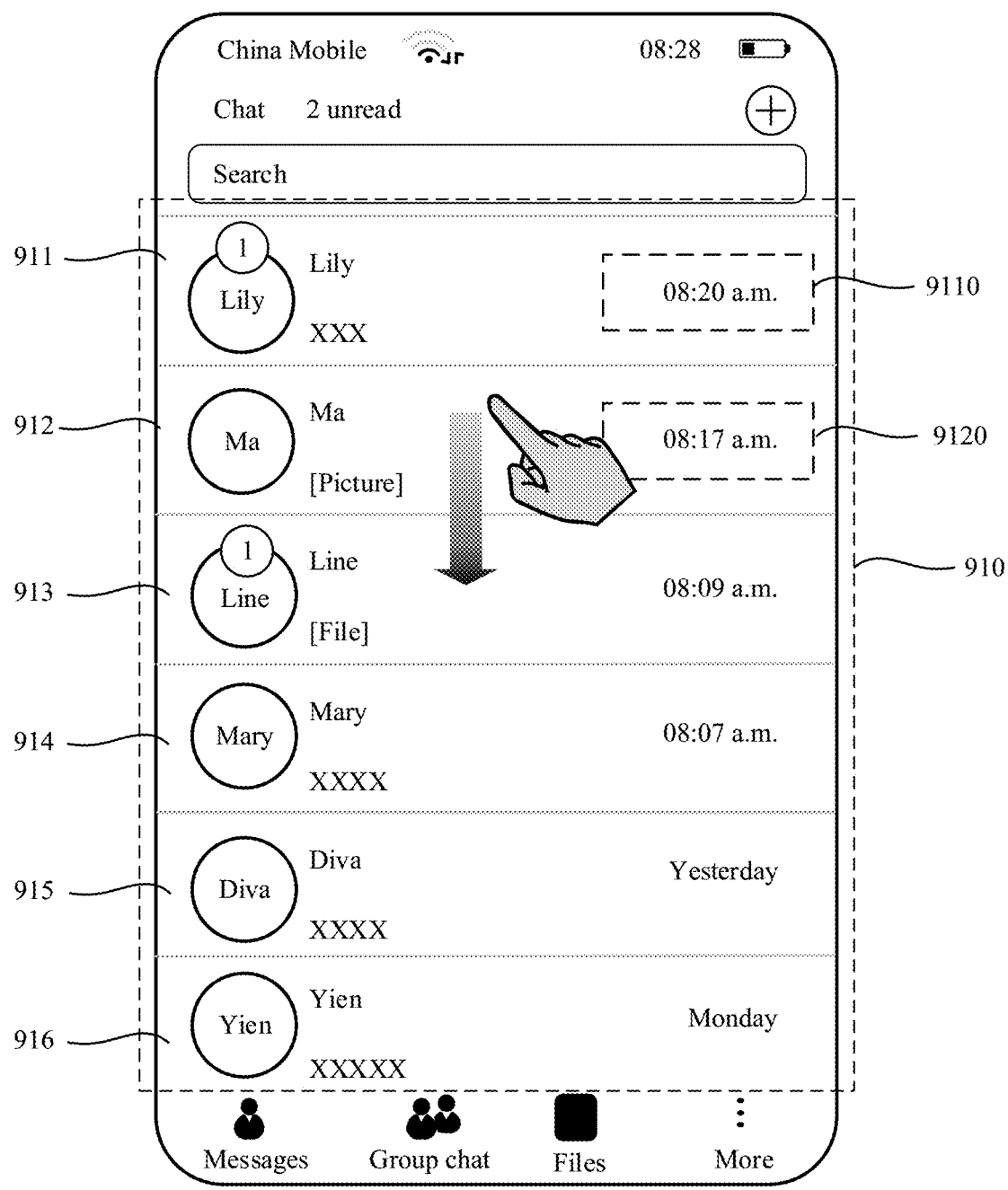
FIG. 8a to FIG. 8d are examples of a group of user interfaces when a menu list in a communication application is updated according to an embodiment of this application.

As shown in FIG. 8a, the user interface 91 may include a menu list 910. The menu list 910 may be provided by a communication application. All menus in the menu list 910 are displayed in the user interface 91, and all the menus include a menu 911 to a menu 916.

In the user interface 91, a timestamp 9110 corresponding to the menu 911 is "08:20 a.m.", which indicates that the electronic device obtains the menu at 08:20 a.m. A timestamp 9120 corresponding to the menu 912 is "8:17 a.m.". Because the timestamp 9110 is later than the timestamp 9120, the electronic device places the menu 911 before the menu 912.

In response to an operation (for example, a tap operation or a slide-down operation) performed by the user on a second menu 912 in the user interface 91, the electronic device may start to traverse the menu list 910. In this case, the electronic device may display a user interface 92 shown in FIG. 8b.

Figure 8B:
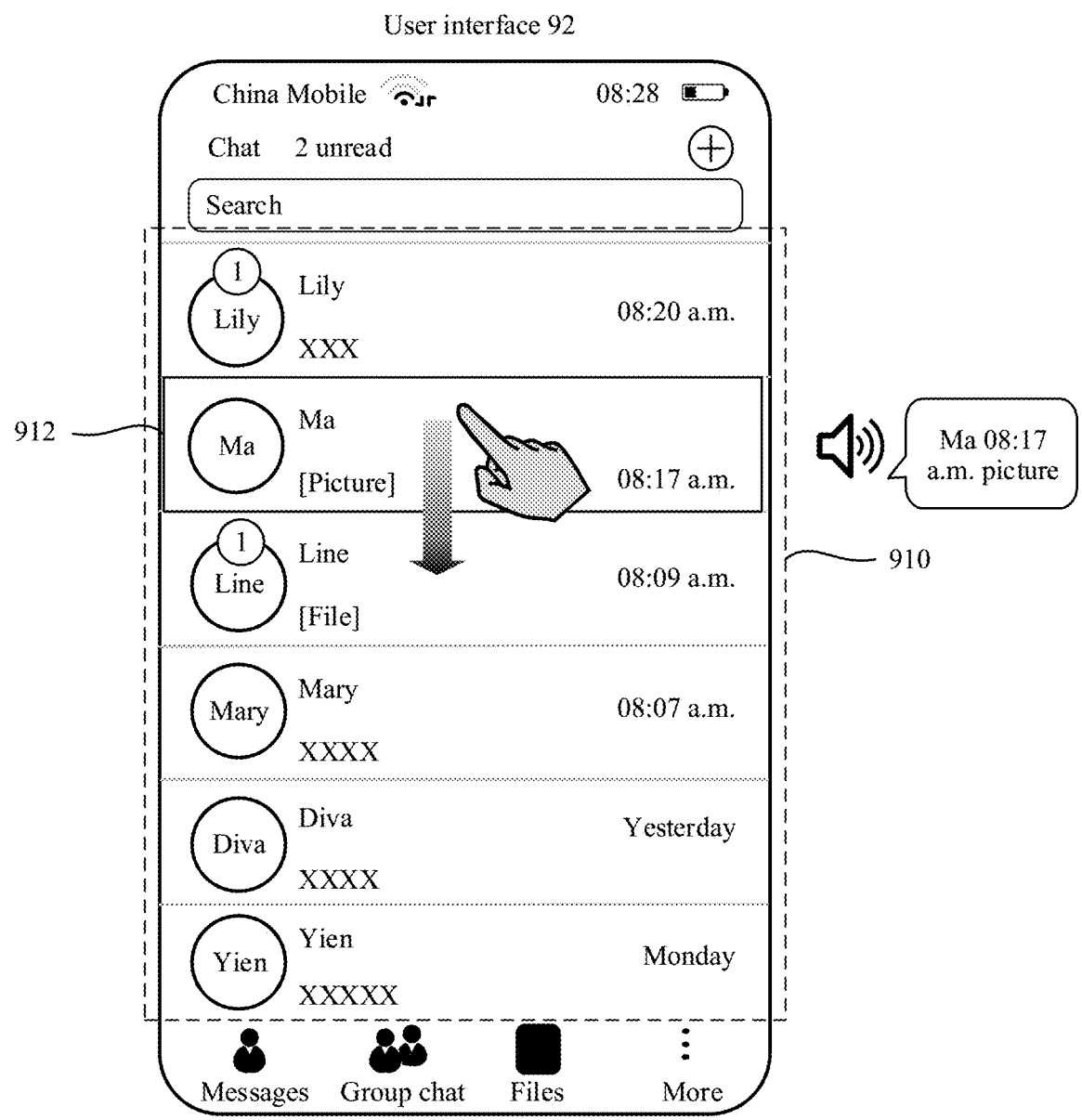

As shown in FIG. 8b, in the user interface 92, the electronic device sets a focus menu in a menu list 910 as a second menu 912. In this case, the electronic device may start to broadcast the menu 912: "ma 08:17 a.m. picture".

In this case, the electronic device receives a new message, and may update the menu list 910.

Figure 8C:
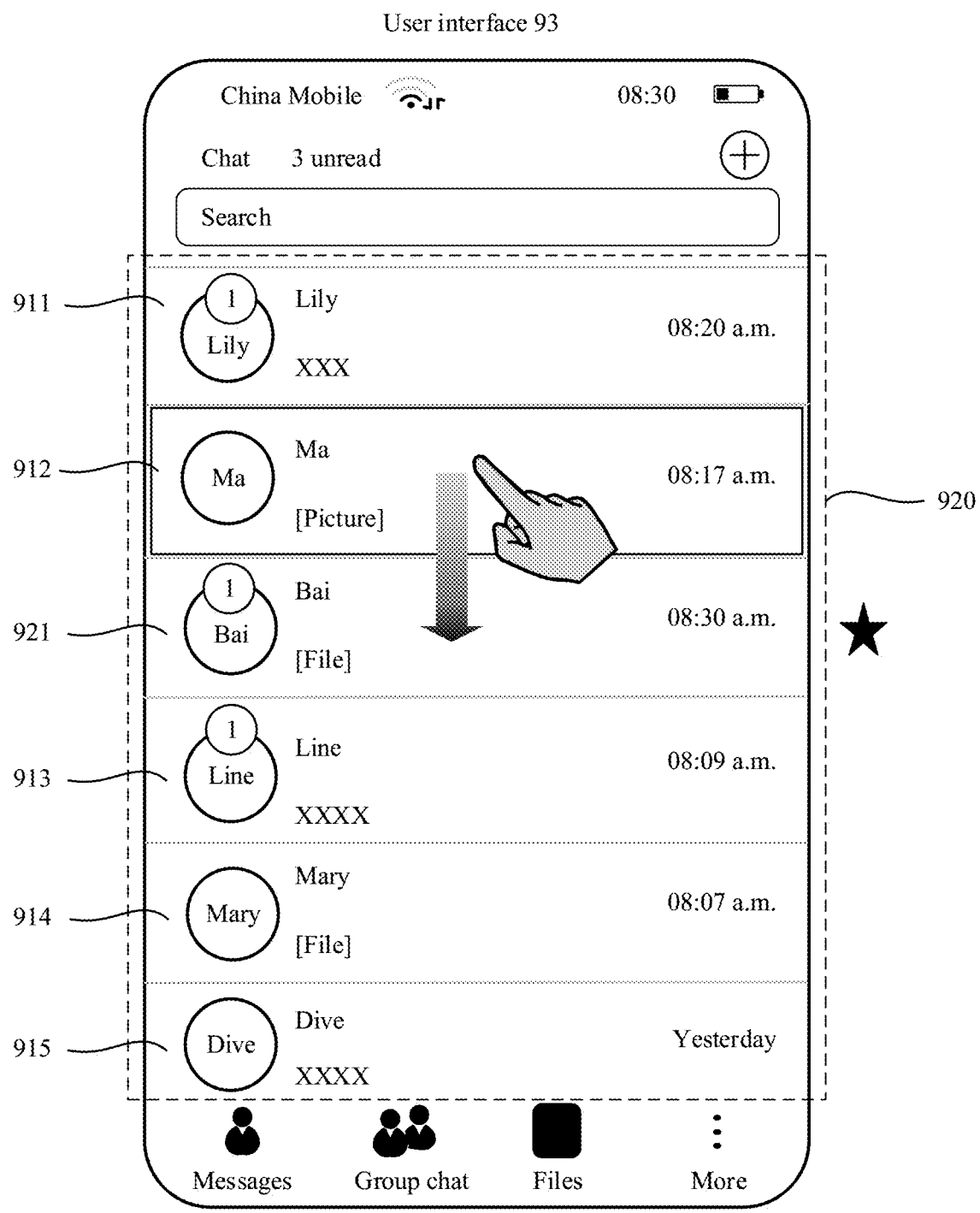

As shown in FIG. 8c, after the menu list 910 is updated, a menu list 920 displayed in a user interface 93 may be obtained. Compared with the menu list 910, a newly added menu in the menu list 920 is 921. Available menus include a menu 911 to a menu 916. A menu 911 to a menu 915 have been displayed in the user interface 93. The menu 916 is not displayed in the user interface 93, but may be displayed in the user interface 93.

For a method for obtaining the menu list 920 by the electronic device, refer to the following description.

For menus that are in the available menus and that are before the focus menu in the menu list 910 (including the focus menu), the electronic device may reserve a relative sequence of these menus, and these menus are used as a front part in the menu list 920. To be example, the electronic device may place the menu 911 and the menu 912 in the front part of the menu list 920, and a relative sequence of the menu 911 and the menu 912 in the menu list 920 is the same as a relative sequence of the menu 911 and the menu 912 in the menu list 910.

For the available menus, the electronic device may sort menus that are in these menus and that are after focus menus in the menu list 910, and newly added menus in the menu list 920 according to the service sorting rule of the communication application. That is, the electronic device may sort the menu 913 to the menu 916 (including the menus 913, 914, 915, and 916) and a menu 921 according to a service sorting rule that a latter timestamp of a menu indicates a higher priority of the menu in the menu list. These menus are sorted as a rear part of the menu list 920. That is, the electronic device may place the sorted menu 913 to the sorted menu 916 and the sorted menu 921 after the menu 911 and the menu 912 to obtain a menu list 920.

Because the focus menu in the menu list 910, that is, the menu 912, still exists in the menu list 920, the electronic device may set that the focus menu does not change, and set a focus menu in the menu list 920 to the menu 912.

In response to an operation (for example, a slide-down operation) performed by the user in the user interface 93, the electronic device may start to traverse the menu list 920. In this case, the electronic device may display a user interface 94 shown in FIG. 8d.

Figure 8D:
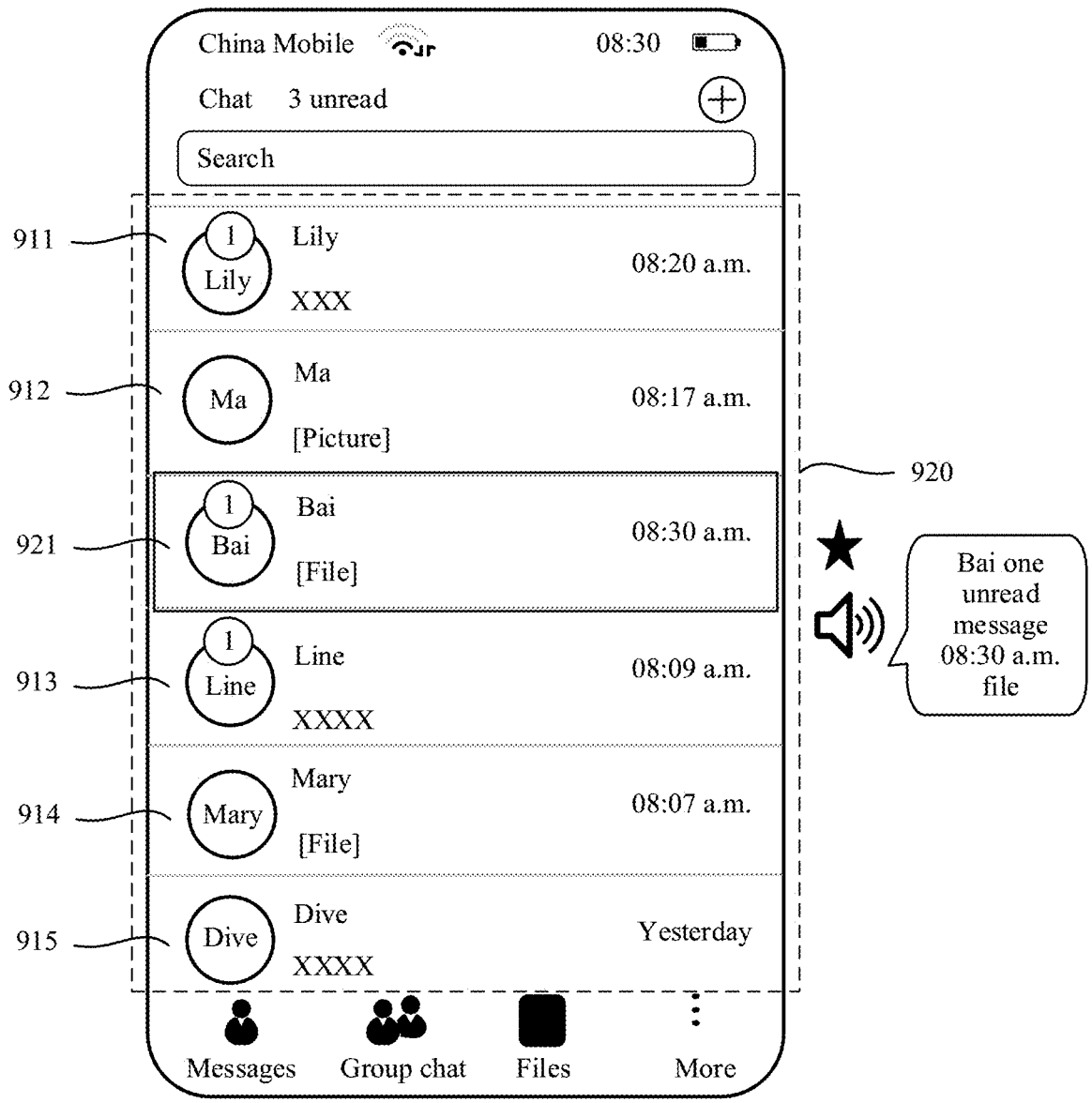

As shown in FIG. 8d, in the user interface 94, the focus menu of the menu list changes from the second menu 912 to a third menu 921. In this case, the electronic device may broadcast the menu 921: "bai one unread message 08:30 a.m. file".

It may be understood that the user may continue to operate the user interface 85 to quickly traverse the menu list 920. If there is still an update, a newly added menu is always quickly traversed by the user.

Application scenario 3: For the menu list 810 provided by the foregoing "WLAN" application, when the electronic device broadcasts the menu 812 without broadcasting the menu 811, and then broadcasts the menu 813, the electronic device detects a new WLAN network, and may update the menu list 810. The electronic device may broadcast the menu list by using the menu list update method provided in this embodiment of this application.

The following describes a related user interface by using an example in which the electronic device updates the menu list in the manner 3 and broadcasts a menu list in the "WLAN" application in this application scenario.

Figure 9:
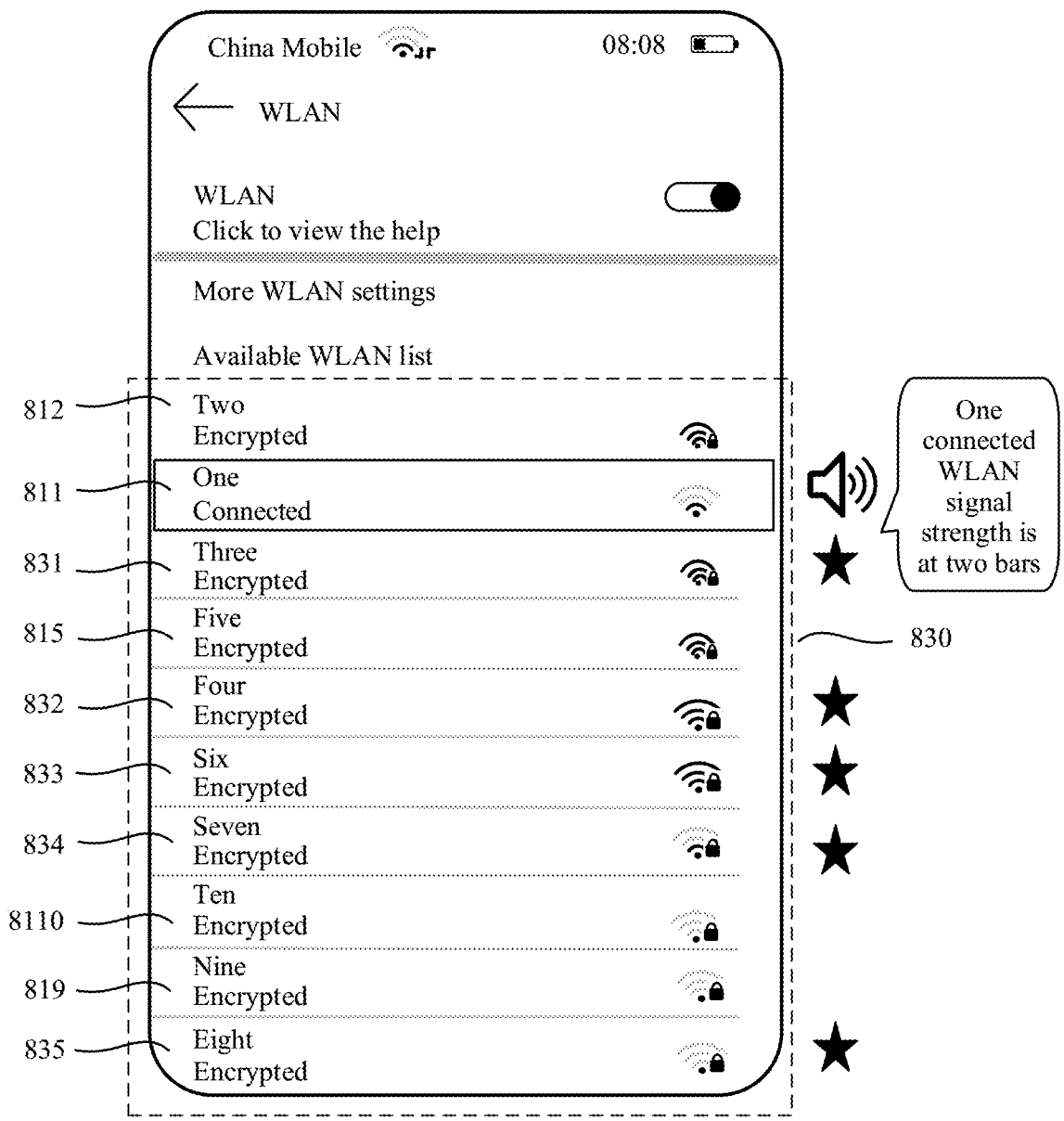
FIG. 9 is another example of a user interface when a menu list in a "WLAN" application is updated according to an embodiment of this application.

As shown in FIG. 9, an updated menu list 830 may be displayed in a user interface 86, and all menus in the menu list 830 are displayed in the user interface 91. Compared with the menu list 810, in the menu list 830, unavailable menus are a menu 813, a menu 814, a menu 816, a menu 817 and a menu 818. Available menus are a menu 811, a menu 812, a menu 815, a menu 819 and a menu 8110, and newly added menus including menus 831, 832, 833, 834, and 835.

For a method for obtaining the menu list 830 by the electronic device, refer to the following description.

For menus that are in the available menus and that are broadcast by the electronic device, the electronic device may reserve a relative sequence of these menus in the menu list 810 before updating, as a front part of the menu list 830. That is, the electronic device may place the menu 812 in the front part of the menu list 830.

For the available menus, the electronic device may sort, according to a service sorting rule of the communication application, menus that are in these menus and that are not broadcast by the electronic device and newly added menus in the menu list 830. That is, the electronic device may sort the menu 811, the menu 812, the menu 815, the menu 819, the menu 8110, and the newly added menu 831 to the newly added menu 835 according to a service sorting rule that a latter timestamp of a menu indicates a higher priority of the menu in the menu list. These menus are sorted as a rear part of the menu list 830. That is, the electronic device may place the sorted menu 811, menu 812, menu 815, menu 819, and menu 8110 and the newly added menu 831 to the newly added menu 835 after the menu 812, to obtain a menu list 830.

Because the focus menu in the menu list 810, that is, the menu 813, does not exist in the menu list 830, and there is an available menu 812 that is broadcast by the electronic device before a focus menu in an old menu list, the electronic device may set, in a new menu list 830, a first menu that is not before the focus menu 813 in the old menu list, that is, the menu 811 is the focus menu.

Because the menu 811 is not broadcast by the electronic device, the electronic device may automatically broadcast the focus menu once: "one connected WLAN signal strength is at two bars".

It may be understood that the user may continue to operate the user interface 86 to quickly traverse the menu list 830.

The following first describes an example of an electronic device 100 provided in this embodiment of this application.

Figure 10:
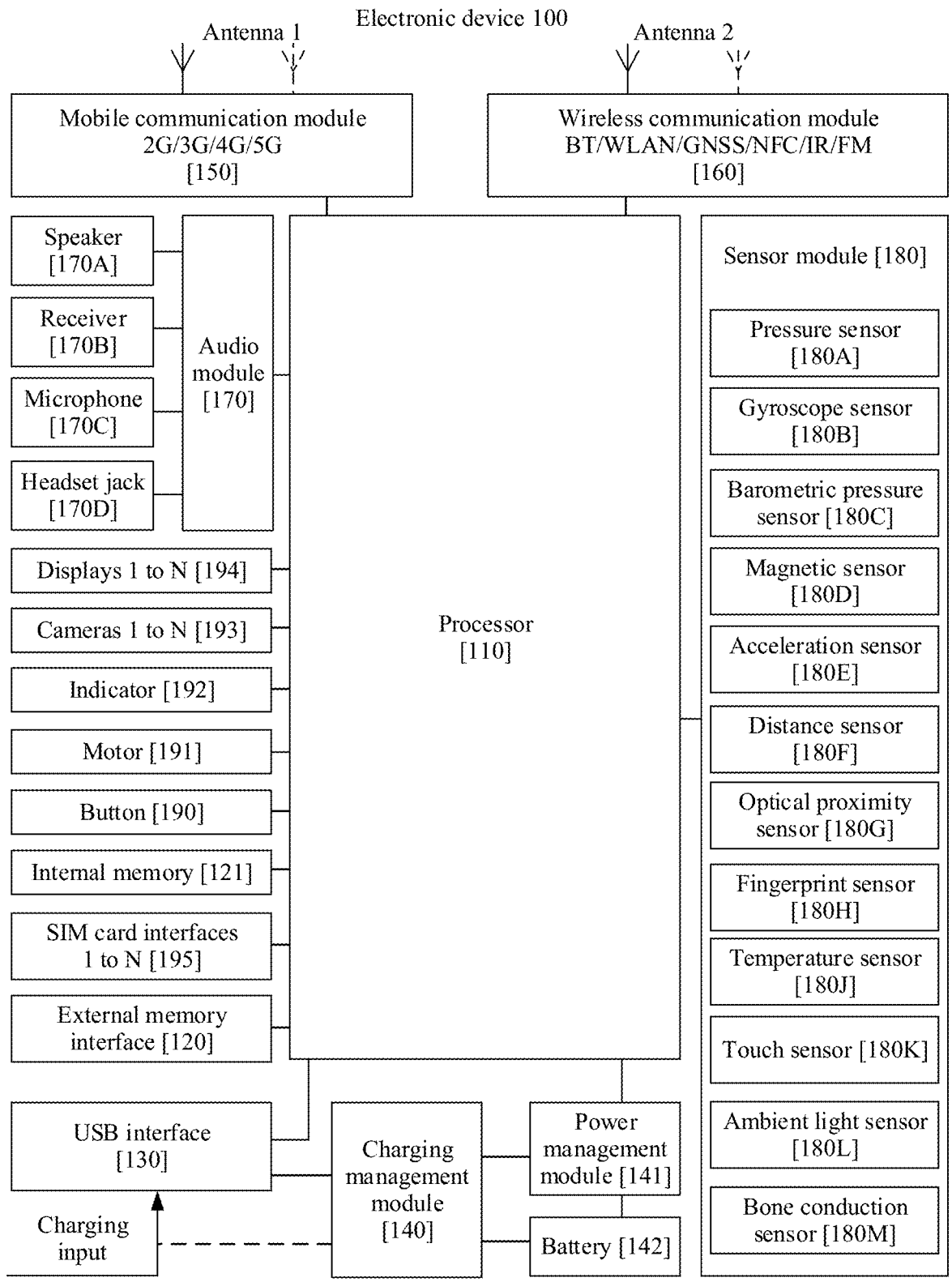
FIG. 10 is a schematic diagram of a structure of an electronic device 100 according to an embodiment of this application.

FIG. 10 is a schematic diagram of a structure of an electronic device 100 according to an embodiment of this application.

The electronic device 100 is used as an example below to describe embodiments in detail. It should be understood that the electronic device 100 may have more or fewer components than those shown in the figure, or may combine two or more components, or may have different component configurations. Various components shown in the figure may be implemented in hardware including one or more signal processing and/or application-example integrated circuits, software, or a combination of hardware and software.

The electronic device 100 may include a processor 110, an external memory interface 120, an internal memory 121, a universal serial bus (USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (subscriber identity module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of this application does not constitute an example limitation on the electronic device 100. In some other embodiments of this application, the electronic device 100 may include more or fewer components than those shown in the figure, or some components may be combined, or some components may be split, or different component arrangements may be used. The illustrated components may be implemented in hardware, software, or a combination of software and hardware.

The processor 110 may include one or more processing units. For example, the processor 110 may include an application processor (AP), a modem processor, a graphics processing unit (GPU), an image signal processor (image signal processor, ISP), a controller, a memory, a video codec, a digital signal processor (DSP), a baseband processor, a neural-network processing unit (NPU), and/or the like. Different processing units may be independent components, or may be integrated into one or more processors.

The controller may be a nerve center and a command center of the electronic device 100. The controller may generate an operation control signal based on an instruction operation code and a time sequence signal, to complete control of instruction reading and instruction execution.

A memory may be further disposed in the processor 110, and is configured to store instructions and data. In some embodiments, the memory in the processor 110 is a cache memory. The memory may store an instruction or data that has been used or cyclically used by the processor 110. If the processor 110 needs to use the instruction or the data again, the processor may directly invoke the instruction or the data from the memory. This avoids repeated access, reduces waiting time of the processor 110, and improves system efficiency.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communication module 160 through the I2S interface, to implement a function of answering a call through a Bluetooth headset.

The PCM interface may also be used to perform audio communication, and sample, quantize, and code an analog signal. In some embodiments, the audio module 170 may be coupled to the wireless communication module 160 through a PCM bus interface. In some embodiments, the audio module 170 may alternatively transmit an audio signal to the wireless communication module 160 through the PCM interface, to implement a function of answering a call through a Bluetooth headset. Both the I2S interface and the PCM interface may be used for audio communication.

The UART interface is a universal serial data bus, and is configured to perform asynchronous communication. The bus may be a two-way communication bus. The bus converts to-be-transmitted data between serial communication and parallel communication. In some embodiments, the UART interface is usually configured to connect the processor 110 to the wireless communication module 160. For example, the processor 110 communicates with a Bluetooth module in the wireless communication module 160 through the UART interface, to implement a Bluetooth function. In some embodiments, the audio module 170 may transmit an audio signal to the wireless communication module 160 through the UART interface, to implement a function of playing music through a Bluetooth headset.

The GPIO interface may be configured by software. The GPIO interface may be configured as a control signal or a data signal. In some embodiments, the GPIO interface may be configured to connect the processor 110 to the camera 193, the display 194, the wireless communication module 160, the audio module 170, the sensor module 180, or the like. The GPIO interface may alternatively be configured as an I2C interface, an I2S interface, a UART interface, an MIPI interface, or the like.

The USB interface 130 is an interface that conforms to a USB standard specification, and may be specifically a mini USB interface, a micro USB interface, a USB type-C interface, or the like. The USB interface 130 may be configured to connect to a charger to charge the electronic device 100, or may be configured to transmit data between the electronic device 100 and a peripheral device, or may be configured to connect to a headset for playing audio through the headset. The interface may be further configured to connect to another electronic device such as an AR device.

A wireless communication function of the electronic device 100 may be implemented by using the antenna 1, the antenna 2, the mobile communication module 150, the wireless communication module 160, the modem processor, the baseband processor, and the like.

The antenna 1 and the antenna 2 are configured to transmit and receive electromagnetic wave signals. Each antenna in the electronic device 100 may be configured to cover one or more communication frequency bands. Different antennas may be further multiplexed to improve antenna utilization. For example, the antenna 1 may be multiplexed as a diversity antenna of a wireless local area network. In some other embodiments, the antenna may be used in combination with a tuning switch.

The mobile communication module 150 may provide a wireless communication solution that includes 2G/3G/4G/5G or the like and that is applied to the electronic device 100. The mobile communication module 150 may include at least one filter, a switch, a power amplifier, a low noise amplifier (LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules in the mobile communication module 150 may be disposed in the processor 110. In some embodiments, at least some functional modules of the mobile communication module 150 may be disposed in a same device as at least some modules of the processor 110.

The wireless communication module 160 may provide a wireless communication solution that includes a wireless local area network (WLAN) (for example, a wireless fidelity (Wi-Fi) network), Bluetooth (BT), a global navigation satellite system (GNSS), frequency modulation (FM), a near field communication (NFC) technology, an infrared (IR) technology, or the like and that is applied to the electronic device 100. The wireless communication module 160 may be one or more components integrating at least one communication processor module. The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

The electronic device 100 may implement an audio function, for example, music playing and recording, through the audio module 170, the speaker 170A, the receiver 170B, the microphone 170C, the headset jack 170D, the application processor, and the like.

The audio module 170 is configured to convert digital audio information into an analog audio signal for output, and is also configured to convert analog audio input into a digital audio signal. The audio module 170 may be further configured to encode and decode an audio signal. In some embodiments, the audio module 170 may be disposed in the processor 110, or some functional modules in the audio module 170 are disposed in the processor 110.

The speaker 170A, also referred to as a "loudspeaker", is configured to convert an audio electrical signal into a sound signal. The electronic device 100 may be used to listen to music or answer a call in a hands-free mode over the speaker 170A.

In this embodiment of this application, the electronic device may broadcast the menu list over the loudspeaker 170A.

The receiver 170B, also referred to as an "earpiece", is configured to convert an audio electrical signal into a sound signal. When a call is answered or speech information is received through the electronic device 100, the receiver 170B may be put close to a human ear to listen to a voice.

The microphone 170C, also referred to as a "mike" or a "microphone", is configured to convert a sound signal into an electrical signal. When making a call or sending voice information, a user may make a sound near the microphone 170C through the mouth of the user, to input a sound signal to the microphone 170C. At least one microphone 170C may be disposed in the electronic device 100. In some other embodiments, two microphones 170C may be disposed in the electronic device 100, to collect a sound signal and implement a noise reduction function. In some other embodiments, three, four, or more microphones 170C may alternatively be disposed in the electronic device 100, to collect a sound signal, implement noise reduction, and identify a sound source, to implement a directional recording function and the like.

The electronic device 100 may implement a display function through the GPU, the display 194, the application processor, and the like. The GPU is a microprocessor for image processing, and is connected to the display 194 and the application processor. The GPU is used to perform mathematical and geometric calculations, and render an image. The processor 110 may include one or more GPUs, which execute program instructions to generate or change display information.

The display 194 is configured to display an image, a video, and the like. The display 194 includes a display panel. The display panel may be a liquid crystal display (LCD), an organic light-emitting diode (OLED), an active-matrix organic light-emitting diode (AMOLED), a flexible light-emitting diode (FLED), a mini-LED, a micro-LED, a micro-OLED, a quantum dot light-emitting diode (QLED), or the like. In some embodiments, the electronic device 100 may include one or N displays 194, where N is a positive integer greater than 1.

The external memory interface 120 may be used to connect to an external storage card, for example, a micro SD card, to extend a storage capability of the electronic device 100. The external memory card communicates with the processor 110 through the external memory interface 120, to implement a data storage function. For example, files such as music and videos can be saved on the external memory card.

The internal memory 121 may be configured to store computer-executable program code. The executable program code includes instructions. The processor 110 runs the instructions stored in the internal memory 121, to perform various function applications of the electronic device 100 and data processing. The internal memory 121 may include a program storage area and a data storage area. The program storage area may store an operating system, an application required by at least one function (for example, a facial recognition function, a fingerprint recognition function, and a mobile payment function), and the like. The data storage area may store data (for example, facial information template data and a fingerprint information template) and the like created during use of the electronic device 100. In addition, the internal memory 121 may include a high-speed random access memory, or may include a nonvolatile memory, for example, at least one magnetic disk storage device, a flash memory, or a universal flash storage (UFS).

The pressure sensor 180A is configured to sense a pressure signal, and can convert the pressure signal into an electrical signal. In some embodiments, the pressure sensor 180A may be disposed on the display 194. There are a plurality of types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 100 determines pressure intensity based on the change in the capacitance. When a touch operation is performed on the display 194, the electronic device 100 detects intensity of the touch operation through the pressure sensor 180A. The electronic device 100 may also calculate a touch location based on a detection signal of the pressure sensor 180A. In some embodiments, touch operations that are performed in a same touch position but have different touch operation intensity may correspond to different operation instructions. For example, when a touch operation whose touch operation intensity is less than a first pressure threshold is performed on an SMS message application icon, an instruction for viewing an SMS message is performed. When a touch operation whose touch operation intensity is greater than or equal to the first pressure threshold is performed on the SMS message application icon, an instruction for creating a new SMS message is performed.

The touch sensor 180K is also referred to as a touch panel. The touch sensor 180K may be disposed on the display 194, and the touch sensor 180K and the display 194 form a touchscreen, which is also referred to as a "touch control screen". The touch sensor 180K is configured to detect a touch operation performed on or near the touch sensor. The touch sensor may transfer the detected touch operation to the application processor to determine a type of the touch event. A visual output related to the touch operation may be provided through the display 194. In some other embodiments, the touch sensor 180K may also be disposed on a surface of the electronic device 100 at a location different from that of the display 194.

The button 190 includes a power button, a volume button, and the like. The button 190 may be a mechanical button, or may be a touch button. The electronic device 100 may receive a key input, and generate a key signal input related to a user setting and function control of the electronic device 100.

In this embodiment of this application, the processor 110 may invoke the computer instructions stored in the internal memory 121, so that the electronic device 100 performs the menu list update method in this embodiment of this application.

With reference to the schematic diagram of the example of the hardware structure of the electronic device 100, the following specifically describes the menu list update method in embodiments of this application.

Figure 11:
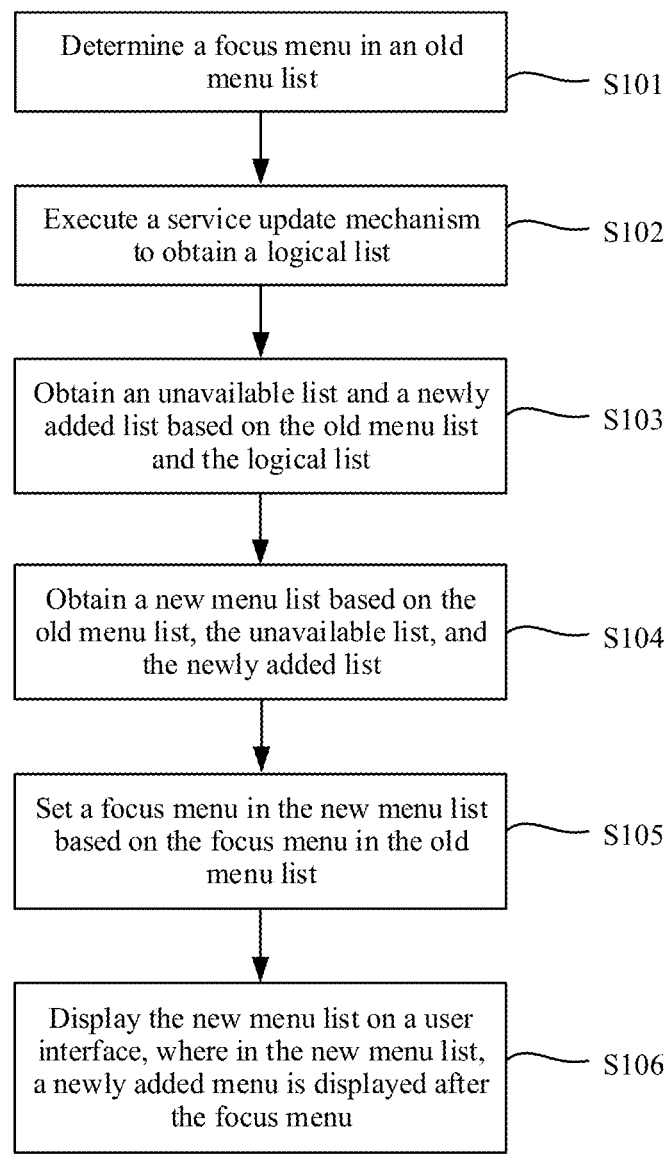
FIG. 11 is an example schematic flowchart of a menu list update method according to an embodiment of this application.

FIG. 11 is an example schematic flowchart of a menu list update method according to an embodiment of this application.

S101: An electronic device determines a focus menu in an old menu list.

The old menu list is a menu list before updating.

The electronic device may determine a last menu broadcast before the old menu list is updated as the focus menu.

For example, the old menu list may be the menu list 810 shown in FIG. 7c, and the electronic device may determine that a focus menu in the menu list 810 is the menu 813.

S102: The electronic device executes a service update mechanism to obtain a logical list.

The logical list refers to a set of all to-be-displayed menus.

The service update mechanism means that the electronic device updates a menu list in an application when an update condition of the menu list in the application is triggered. It may be understood that update conditions for different applications to update menu lists may be different.

For example, for the "WLAN" application in the scenario 1, a service update mechanism of the "WLAN" application may be that when the electronic device detects a new WLAN network, update of the menu list is triggered.

For the communication application in the scenario 2, a service update mechanism of the communication application may be that when the electronic device receives a new message, update of the menu list may be triggered.

S103: The electronic device obtains an unavailable list and a newly added list based on the old menu list and the logical list.

The unavailable list is a set of unavailable menus.

The newly added list is a set of newly added menus.

Based on the old menu list and the logical list, the electronic device obtains all menus that exist in the old menu list but do not exist in the logical list, to obtain the unavailable list; and may further obtain all newly added menus that do not exist in the old menu list but exist in the logical list, to obtain the newly added list.

Specifically, the electronic device may match each menu in the old menu list with menus in the logical list. If a menu does not match each menu in the logical list, the electronic device may determine the menu as an unavailable menu. In this way, the electronic device may obtain the unavailable list.

The electronic device may match each menu in the logical list with menus in the old menu list. If a menu does not match each menu in the old menu list, the electronic device may determine the menu as the newly added menu. In this way, the electronic device may obtain the newly added list.

Figure 12:
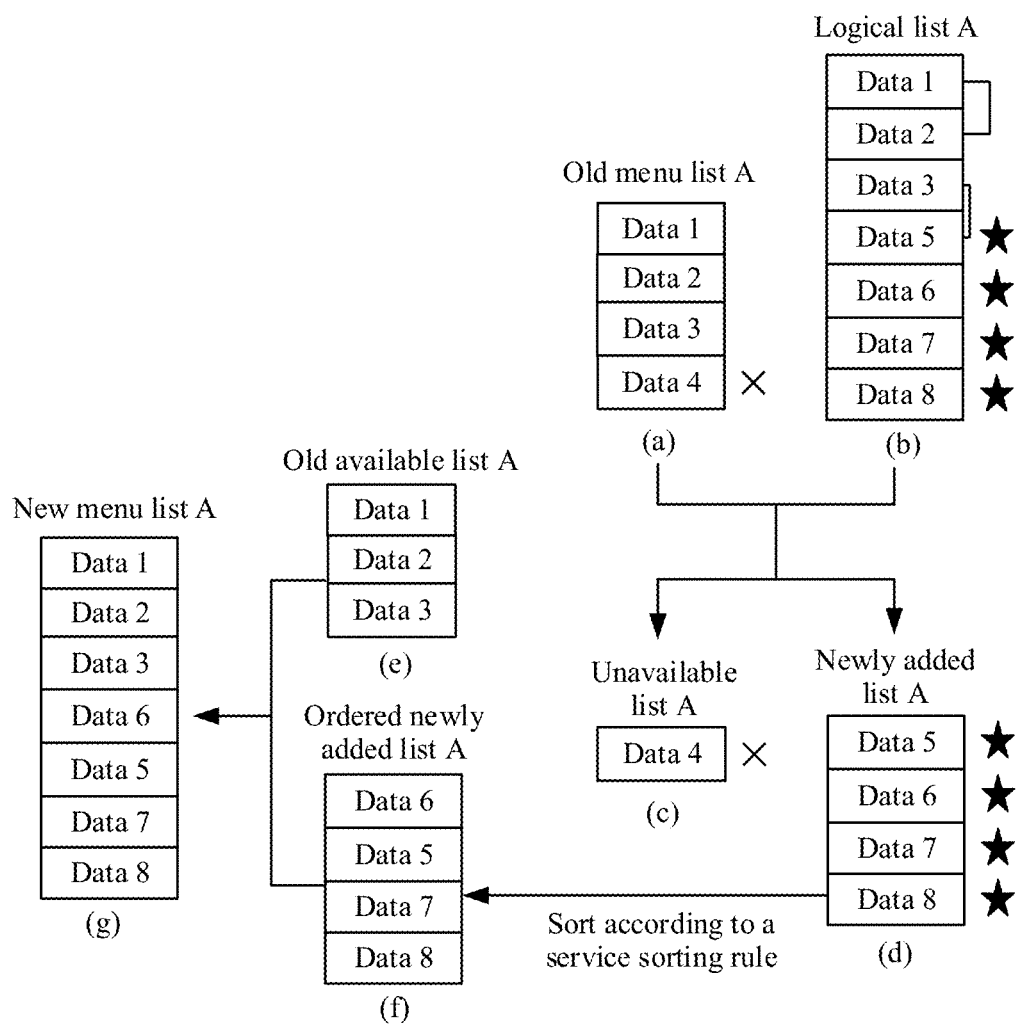
FIG. 12 is a group of schematic diagrams in which an electronic device obtains a new menu list in a manner 1 according to an embodiment of this application.

(a) in FIG. 12 is a schematic diagram of an old menu list A of an application. Menus in the old menu list A may include data 1, data 2, data 3, and data 4. (b) in FIG. 12 is a schematic diagram of a logical list A obtained when the electronic device executes the service update logic to update the old menu list A. Menus in the logical list A may include the data 1, the data 2, the data 3, data 5, data 6, data 7, and data 8.

(c) in FIG. 12 is a schematic diagram of an unavailable list A. The unavailable list A is obtained by the electronic device by comparing the old menu list A with the logical list A. The data 4 exists in the old menu list A but does not exist in the logical list A. Therefore, the data 4 is an unavailable menu in the unavailable list A.

(d) in FIG. 12 is a schematic diagram of a newly added list A. The electronic device may obtain menus in the newly added list A, namely, the data 5, the data 6, the data 7, and the data 8 by comparing the old menu list A with the logical list A.

S104: The electronic device obtains a new menu list based on the old menu list, the unavailable list, and the newly added list.

The new menu list refers to a menu list after updating.

For an old menu list, an unavailable list, and a newly added list, in different scenarios, the electronic device may obtain different new menu lists in different manners. The following describes in detail different manners of obtaining the new menu list by the electronic device.

Figure 13:
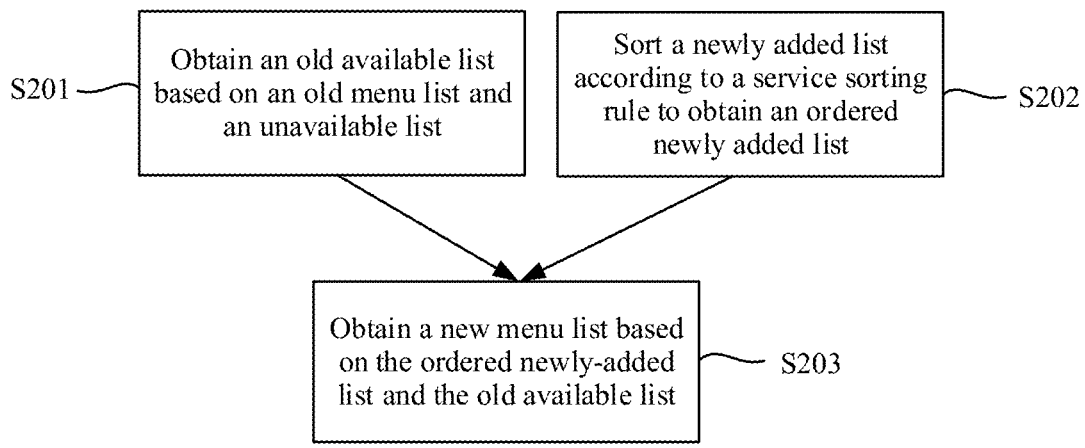
FIG. 13 is a flowchart of obtaining a new menu list by an electronic device in a manner 1 according to an embodiment of this application.

Manner 1: FIG. 13 is a flowchart in which the electronic device obtains a new menu list in the manner 1 in some embodiments.

As shown in FIG. 13, the process includes operation S201 to operation S203. The following describes operation S201 to operation S203 in detail with reference to a group of schematic diagrams in which the electronic device obtains the new menu list in the manner 1 shown in FIG. 12.

S201: The electronic device obtains an old available list based on the old menu list and the unavailable list.

The old available list is a set of available menus.

The electronic device may remove all unavailable menus from the old menu list to obtain the old available list.

Specifically, the electronic device may match each unavailable menu in the unavailable list with all menus in the old menu list. If the unavailable menu in the unavailable list is the same as a menu in the old menu list, the unavailable menu may be removed from the old menu list to obtain the old available list.

(e) in FIG. 12 is a schematic diagram of an old available list A. The electronic device may remove an unavailable menu in the unavailable menu A, namely, the data 4, from the old menu list A, to obtain the old available list A. Menus in the old available list A may include the data 1, the data 2, and the data 3.

It may be understood that a relative sequence between the menus in the old available list is the same as a relative sequence between the menus in the old menu list.

S202: The electronic device sorts the newly added list according to a service sorting rule, to obtain an ordered newly-added list.

The ordered newly-added list is a set of newly added menus that are sorted according to the service sorting rule.

The service sorting rule is a rule used by the electronic device to sort a plurality of menus of an application. Service sorting rules of different applications may be different.

For example, for the "WLAN" application in the scenario 1, a service sorting rule of the "WLAN" application may be that an unencrypted menu is placed before an encrypted menu, and a menu with a strong "WLAN" network signal in the unencrypted menu is placed before a menu with a weak signal. If signal strength is the same, a menu with high security is placed before a menu with low security. For a sorting rule of an encrypted menu, refer to a sorting rule of the unencrypted menu. Details are not described herein again.

For the communication application in the scenario 3, a service sorting rule of the communication application may be sorting based on timestamps corresponding to the plurality of menus, and a latter timestamp indicates a higher priority of a menu in the menu list.

For a newly added list of a different application, the electronic device may sort the newly added list according to a service sorting rule of the application, to obtain an ordered newly-added list.

(f) in FIG. 12 is a schematic diagram of an ordered newly-added list A. The electronic device may sort the newly added list A according to the service sorting rule to obtain the ordered newly-added list A. Menus in the newly added list A are sequentially the data 5, the data 6, the data 7, and the data 8. A sequence of menus in the ordered newly-added list A is changed to be sequentially the data 6, the data 5, the data 7, and the data 8.

S203: The electronic device obtains anew menu list based on the ordered newly-added list and the old available list.

The electronic device may place the ordered newly-added list after the old available list, to obtain the new menu list.

(g) in FIG. 12 is a schematic diagram of a new menu list A. The electronic device may place the ordered newly-added list A after the old available list A, to obtain the new menu list A.

For example, in the scenario 1, the menu list 820 is obtained in the manner 1.

Figure 14:
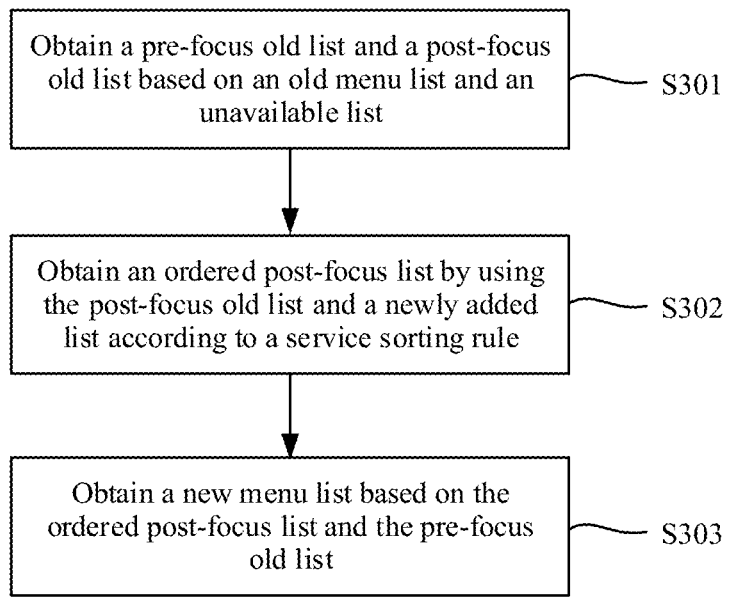
FIG. 14 is a flowchart of obtaining a new menu list in a manner 2 according to an embodiment of this application.

Manner 2: FIG. 14 is a flowchart in which the electronic device obtains a new menu list in the manner 2 in some embodiments.

As shown in FIG. 14, the process includes operation S301 to operation S303. The following describes operation S301 to operation S303 in detail with reference to a group of schematic diagrams in which the electronic device obtains the new menu list in the manner 2 shown in FIG. 15.

S301: The electronic device obtains a pre-focus old list and a post-focus old list based on the old menu list and the unavailable list.

The pre-focus old list refers to a set of available menus (including the focus menu) before the focus menu in the old menu list.

The post-focus old list refers to a set of available menus after the focus menu in the old menu list.

For all menus (including the focus menu) before the focus menu in the old menu list, the electronic device may remove unavailable menus from these menus, to obtain the pre-focus old list.

Specifically, the electronic device may obtain all the menus (including the focus menu) before the focus menu from the old menu list, and then traverse these menus. Each time a menu is traversed, the menu is matched with the menus in the unavailable list. If the menu is the same as a menu in the unavailable list, the electronic device may determine the menu as an unavailable menu, and remove the menu. Until these menus are traversed, all unavailable menus are removed, and the pre-focus old list is obtained.

It may be understood that, when there is no focus menu in the old menu list, the electronic device may remove the unavailable menus in the old menu list, to obtain the pre-focus old list.

Figure 15:
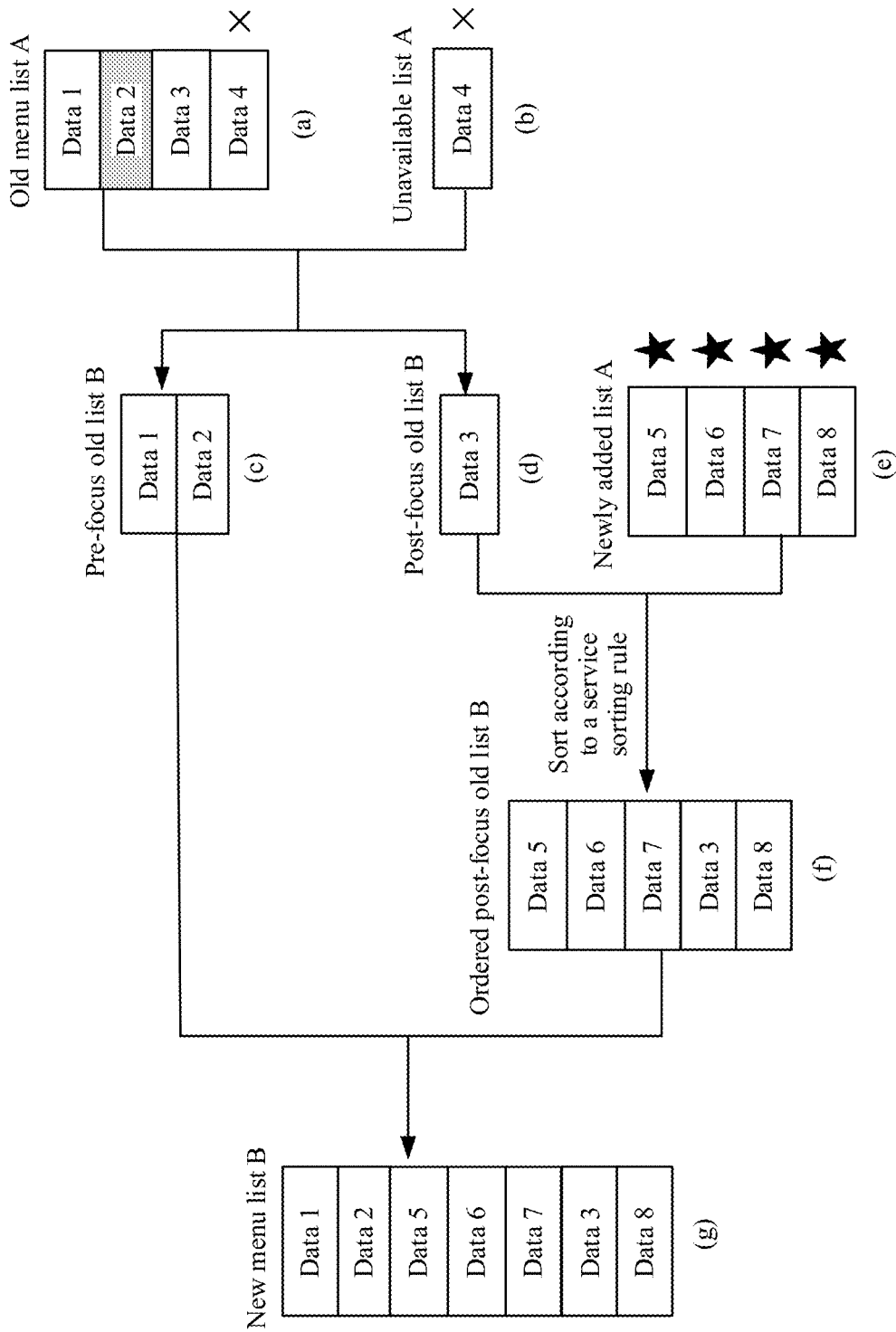
FIG. 15 is a group of schematic diagrams of obtaining a new menu list in a manner 2 according to an embodiment of this application.

(c) in FIG. 15 is a schematic diagram of a pre-focus old list B. The pre-focus old list B is obtained by the electronic device based on an old menu list A shown in (a) in FIG. 15 and an unavailable list A shown in (b) in FIG. 15.

If a focus menu in the old menu list A is data 2, data 1 is a menu before the focus menu. If an unavailable menu in the unavailable list A is data 4, the electronic device may determine that the data 1 and the data 2 are menus in the pre-focus old list.

The electronic device may first obtain all menus after the focus menu from the old menu list, and then remove the unavailable menu from these menus to obtain the post-focus old list. For the process, refer to the description of obtaining the pre-focus list by the electronic device in operation S301. Details are not described herein again.

(d) in FIG. 15 is a schematic diagram of a post-focus old list B. The post-focus old list B is obtained by the electronic device based on the old menu list A shown in (a) in FIG. 15 and the unavailable list A shown in (b) in FIG. 15.

If the focus menu in the old menu list A is the data 2, the electronic device obtains menus after the focus menu, namely, data 3 and the data 4. Because the unavailable menu in the unavailable list A is the data 4, the electronic device removes the data 4, and determines the data 3 as a menu in the pre-focus old list B.

S302: The electronic device obtains an ordered post-focus list by using the post-focus old list and the newly added list according to the service sorting rule.

The electronic device may sort all menus in the post-focus old list and the newly added list according to the service sorting rule, to obtain the ordered post-focus list. The ordered post-focus list is a set of all sorted menus.

(f) in FIG. 15 is a schematic diagram of an ordered post-focus list B. The electronic device may sort, according to the service sorting rule, menus in the post-focus old list B together with menus in a newly added list A shown in (e) in FIG. 15, and obtain the ordered post-focus list B.

S303: The electronic device obtains a new menu list based on the ordered post-focus list and the pre-focus old list.

The electronic device may place the ordered post-focus list after the pre-focus old list, to obtain the new menu list.

(g) in FIG. 15 is a schematic diagram of a new menu list B. The electronic device may place the ordered post-focus list B after the pre-focus old list B, to obtain the new menu list B.

For example, in the scenario 2, the menu list 920 is obtained in the manner 2.

Figure 16:
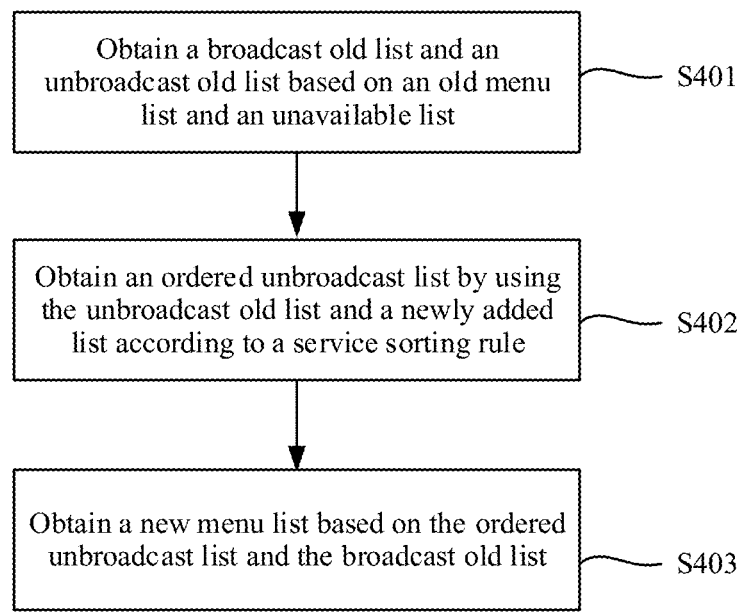
FIG. 16 is a flowchart of obtaining another new menu list by an electronic device in a manner 3 according to an embodiment of this application.

Manner 3: FIG. 16 is a flowchart in which the electronic device obtains another new menu list in the manner 3 in some other embodiments.

As shown in FIG. 16, the process includes operation S401 to operation S403. The following describes operation S401 to operation S403 in detail with reference to a group of schematic diagrams in which the electronic device obtains the new menu list in the manner 3 shown in FIG. 17.

S401: The electronic device obtains a broadcast old list and an unbroadcast old list based on the old menu list and the unavailable list.

The broadcast old list is a set of available menus that are broadcast.

The unbroadcast old list is a set of available menus that are not broadcast.

The broadcast old list is a set of available menus that are broadcast by the electronic device.

For all menus in the old menu list, the electronic device may remove an unavailable menu from these menus, and then determine a menu that is broadcast in remaining menus, to obtain the broadcast old list.

Specifically, for an old menu list, the electronic device may set a broadcast identifier for each menu in the old menu list. The broadcast identifier is used to distinguish whether the menu is broadcast by the electronic device. For example, "0" and "1" may be used as broadcast identifiers of a menu. If the menu is broadcast, the electronic device may set the broadcast identifier of the menu to "0". Otherwise, the broadcast identifier of the menu is set to "1".

The electronic device may first remove the unavailable menu from the old menu list. For the process, refer to the description of removing the unavailable menu from the old menu list in operation S301. Details are not described herein again. Then, for all menus excluding the unavailable menu in the old menu list, the electronic device may determine, by using broadcast identifiers of these menus, a set of menus that are broadcast in these menus, to obtain the broadcast old list; and determine a set of menus that are not broadcast in these menus, to obtain the unbroadcast old list.

Figure 17:
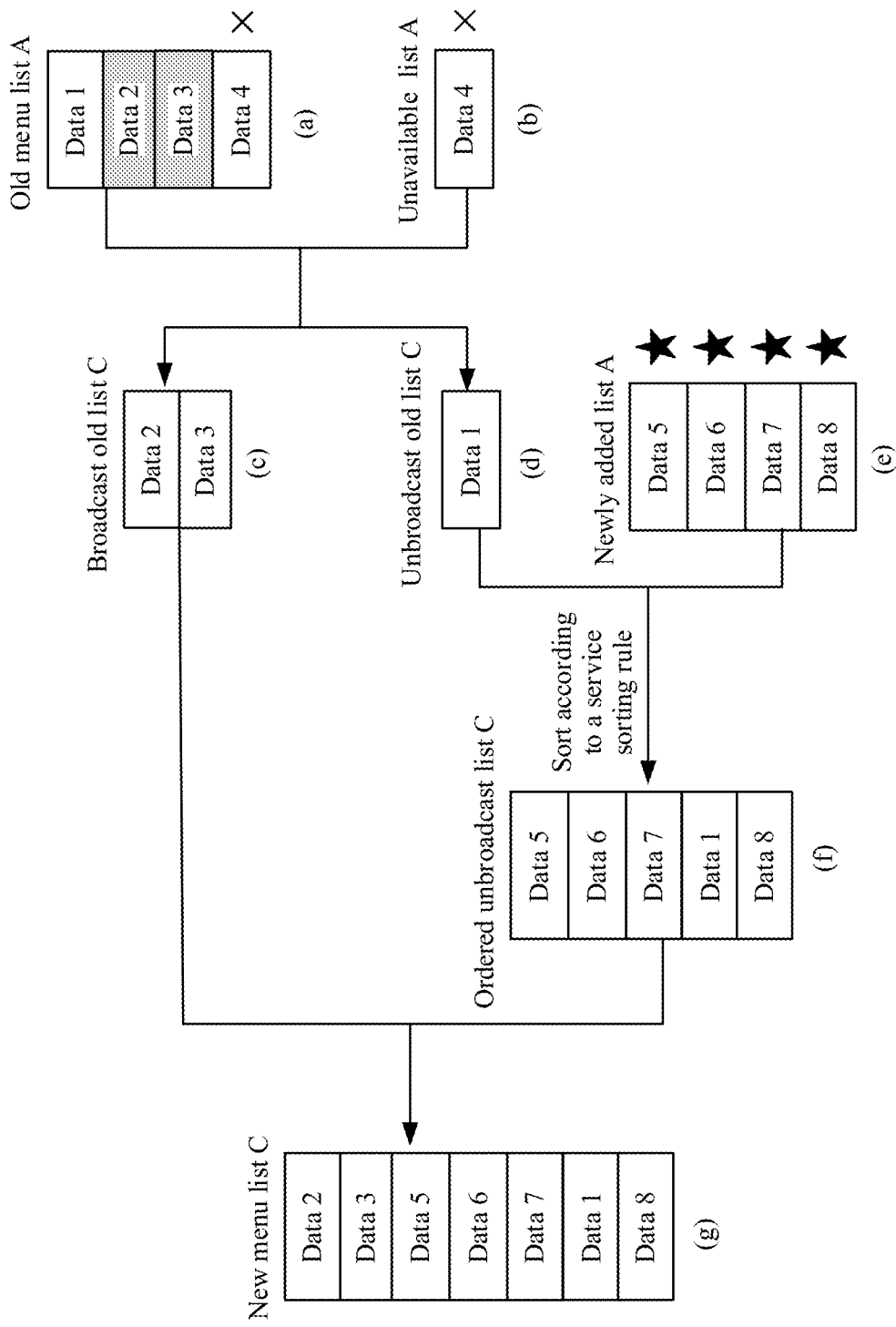
FIG. 17 is a group of schematic diagrams of obtaining a new menu list in a manner 3 according to an embodiment of this application.

(c) in FIG. 17 is a schematic diagram of a broadcast old list C. The broadcast old list C is obtained by the electronic device based on an old menu list A shown in (a) in FIG. 17 and an unavailable list A shown in (b) in FIG. 17. It is assumed that, in this case, menus that are broadcast in the old menu list A are data 2 and data 3. Because unavailable data in the unavailable list A is data 4, the electronic device may determine that menus in the broadcast old list C are the data 2 and the data 3.

For all menus in the old menu list, the electronic device may remove an unavailable menu from these menus, and then determine a menu that is not broadcast in remaining menus, to obtain the unbroadcast old list. For the process, refer to the description of obtaining the broadcast old list by the electronic device in operation S401. Details are not described herein again.

(d) in FIG. 17 is a schematic diagram of an unbroadcast old list C. The unbroadcast old list C is obtained by the electronic device based on the old menu list A shown in (a) in FIG. 17 and the unavailable list A shown in (b) in FIG. 15.

It is assumed that, in this case, menus that are not broadcast in the old menu list A are data 1 and the data 4. Because the unavailable data in the unavailable list A is the data 4, the electronic device may determine that a menu in the unbroadcast old list C is the data 1.

S402: The electronic device obtains an ordered unbroadcast list by using the unbroadcast old list and a newly added list according to the service sorting rule.

The electronic device may sort all menus in the unbroadcast old list and the newly added list according to the service sorting rule, to obtain the ordered unbroadcast list. The ordered unbroadcast list is a set of all sorted menus.

(f) in FIG. 17 is a schematic diagram of an ordered unbroadcast list C. The electronic device may sort, according to the service sorting rule, the menu in the unbroadcast old list C together with menus in the newly added list A shown in (e) in FIG. 17, to obtain the ordered unbroadcast list C.

S403: The electronic device obtains a new menu list based on the ordered unbroadcast list and the broadcast old list.

The electronic device may place the ordered unbroadcast list after the broadcast old list, to obtain the new menu list.

(g) in FIG. 17 is a schematic diagram of a new menu list C. The electronic device may place the ordered unbroadcast list C after the broadcast old list C, to obtain the new menu list C. That is, the new menu list C is created by For example, in the scenario 3, the menu list 830 is obtained in the manner 3.

S105: The electronic device sets a focus menu in the new menu list based on the focus menu in the old menu list.

Figure 18:
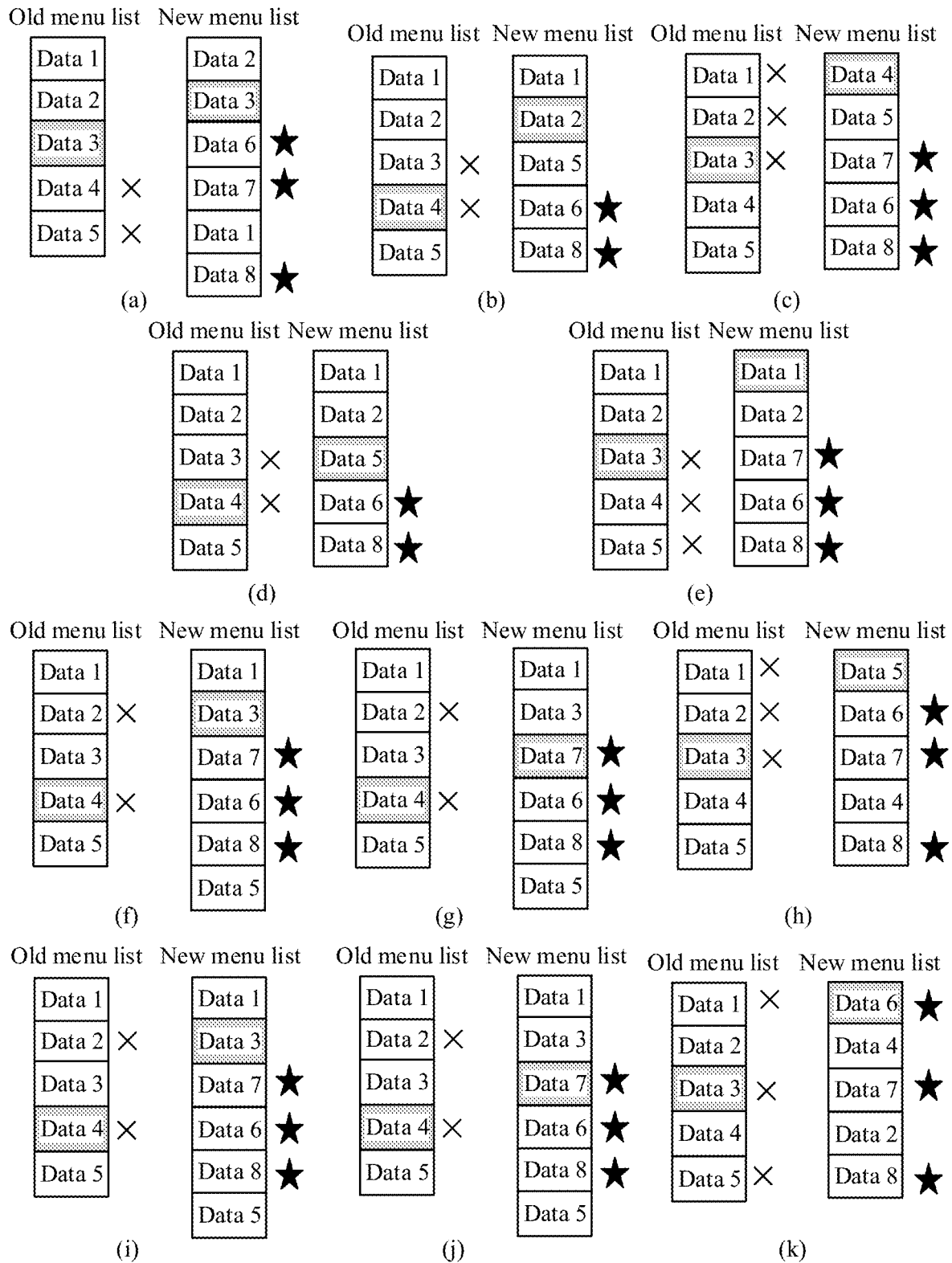
FIG. 18 is a group of schematic diagrams in which an electronic device sets a focus menu in a new menu list according to an embodiment of this application.

FIG. 18 is a group of schematic diagrams in which the electronic device sets the focus menu in the new menu list.

In a case, if the electronic device determines that the focus menu in the old menu list is an available menu, the electronic device may set the focus menu in the new menu list to be the same as the focus menu in the old menu list.

As shown in (a) in FIG. 18, it is assumed that data 3 in the old menu list is the focus menu. The focus menu is not an unavailable menu. In other words, the focus menu still exists in the new menu list. In this case, the electronic device may set the focus menu in the new menu list to be the same as the focus menu in the old menu list, namely, the data 3.

In another case, if the electronic device determines that the focus menu in the old menu list is an unavailable menu, the electronic device may alternatively set the focus menu in the new menu list in different manners according to different manners that the electronic device obtains the new menu list.

In some embodiments, if the electronic device determines the new menu list in the foregoing manner 1, the focus menu in the new menu list may be set in two different setting manners.

Setting manner 1: The electronic device may set the focus menu in the new menu list based on whether there is an available menu before the focus menu in the old menu list.

Specifically, if there is an available menu before the focus menu in the old menu list, the electronic device may set a first available menu before the focus menu in the old menu list as the focus menu in the new menu list.

As shown in (b) in FIG. 18, it is assumed that data 4 in the old menu list is a focus menu, the focus menu is an unavailable menu, that is, the focus menu does not exist in the new menu list, a first available menu before the focus menu in the old menu list is data 2, the electronic device may set the data 2 as the focus menu in the new menu list.

If there is no available menu before the focus menu in the old menu list, the electronic device may set a first menu in the new menu list as the focus menu.

As shown in (c) in FIG. 18, it is assumed that data 3 in the old menu list is a focus menu, the focus menu is an unavailable menu, and all menus before the focus menu, that is, data 1 and data 2, are unavailable menus, the electronic device may set a first menu in the new menu list, that is, data 4, as the focus menu.

Setting manner 2: The electronic device may set the focus menu in the new menu list based on whether there is an available menu after the focus menu in the old menu list.

Specifically, if there is an available menu after the focus menu in the old menu list, the electronic device may set a first available menu after the focus menu in the old menu list as the focus menu in the new menu list.

As shown in (d) in FIG. 18, it is assumed that data 4 in the old menu list is the focus menu, the focus menu is an unavailable menu, and a first available menu after the focus menu in the old menu list is data 5, the electronic device may set the data 5 as the focus menu in the new menu list.

If there is no available menu after the focus menu in the old menu list, the electronic device may set a first menu in the new menu list as the focus menu.

As shown in (e) in FIG. 18, it is assumed that data 3 in the old menu list is the focus menu, the focus menu is an unavailable menu, and both menus after the focus menu, that is, data 4 and data 5, are both unavailable menus, the electronic device may set a first menu in the new menu list, that is, data 1, as the focus menu.

In some embodiments, if the electronic device determines the new menu list in the foregoing manner 2, the focus menu in the new menu list may be set in two different setting manners.

The electronic device may set the focus menu in the new menu list based on whether there is an available menu before the focus menu in the old menu list.

Setting manner 1: If there is an available menu before the focus menu in the old menu list, the electronic device may set a first available menu before the focus menu in the old menu list as the focus menu in the new menu list.

As shown in (f) in FIG. 18, it is assumed that data 4 in the old menu list is the focus menu, the focus menu is an unavailable menu, and in menus data 1, data 2, and data 3 before the focus menu, data 2 is an unavailable menu, and both the data 1 and the data 3 are available menus, the electronic device may set a first available menu before the focus menu in the old menu list, namely, the data 3, as the focus menu in the new menu list.

If there is no available menu before the focus menu in the old menu list, the electronic device may set a first menu in the new menu list as the focus menu.

As shown in (h) in FIG. 18, it is assumed that data 3 in the old menu list is the focus menu, the focus menu is an unavailable menu, and both menus before the focus menu, that is, data 1 and data 2, are both unavailable menus, the electronic device may set a first menu in the new menu list, that is, data 5, as the focus menu.

Setting manner 2: If there is an available menu before the focus menu in the old menu list, the electronic device may alternatively set, in the new menu list, that a first menu that is not before the focus menu in the old menu list as the focus menu.

As shown in (g) in FIG. 18, it is assumed that data 4 in the old menu list is the focus menu, the focus menu is an unavailable menu, and in menus data 1, data 2, and data 3 before the focus menu, data 2 is an unavailable menu, and both the data 1 and the data 3 are available menus, the electronic device may set, in the new menu list, that the first menu that is not before the focus menu in the old menu list, that is, data 7, as the focus menu in the new menu list.

If there is no available menu before the focus menu in the old menu list, the electronic device may set a first menu in the new menu list as the focus menu. For details, refer to the foregoing description of (h) in FIG. 18. Details are not described herein again.

In some embodiments, if the electronic device determines the new menu list in the foregoing manner 3, the focus menu in the new menu list may be set in two different setting manners.

The electronic device may set the focus menu in the new menu list based on whether there is an available menu that is broadcast by the electronic device before the focus menu in the old menu list.

Setting manner 1: If there is an available menu that is broadcast by the electronic device before the focus menu in the old menu list, the electronic device may set a first available menu that is broadcast by the electronic device before the focus menu in the old menu list as the focus menu in the new menu list.

As shown in (i) in FIG. 18, it is assumed that data 4 in the old menu list is the focus menu, the focus menu is an unavailable menu, and in menus data 1, data 2, and data 3 before the focus menu, data 2 is an unavailable menu, and both the data 1 and the data 3 are available menus that have been broadcast by the electronic device, the electronic device may set a first available menu that is broadcast by the electronic device before the focus menu in the old menu list, namely, the data 3, as the focus menu in the new menu list.

If there is no available menu that is broadcast by the electronic device before the focus menu in the old menu list, the electronic device may set a first menu in the new menu list as the focus menu.

As shown in (k) in FIG. 18, it is assumed that data 3 in the old menu list is the focus menu, the focus menu is an unavailable menu, the menu data 1 before the focus menu is an unavailable menu, and data 2 is an available menu, but the data 2 is not broadcast by the electronic device, that is, before the electronic device, there is not an available menu that is broadcast by the electronic device, the electronic device may set a first menu in the new menu list, that is, data 4, as the focus menu.

Setting manner 2: If there is an available menu that is broadcast by the electronic device before the focus menu in the old menu list, the electronic device may alternatively set, in the new menu list, that a first menu that is not before the focus menu in the old menu list as the focus menu.

As shown in j) in FIG. 18, it is assumed that data 4 in the old menu list is the focus menu, the focus menu is an unavailable menu, and in menus data 1, data 2, and data 3 before the focus menu, data 2 is an unavailable menu, and both the data 1 and the data 3 are available menus that have been broadcast by the electronic device, the electronic device may set, in the new menu list, that a first menu that is not before the focus menu in the old menu list, that is, data 7, as the focus menu in the new menu list.

If there is no available menu that is broadcast by the electronic device before the focus menu in the old menu list, the electronic device may set a first menu in the new menu list as the focus menu. For details, refer to the foregoing description of (k) in FIG. 18. Details are not described herein again.

In some embodiments, for the focus menu in the new menu list, if the focus menu is not broadcast by the electronic device before the old menu list is updated, the electronic device automatically broadcasts the focus menu once. If the focus menu is broadcast by the electronic device before the old menu list is updated, the electronic device does not automatically broadcast the focus menu.

Specifically, for an old menu list, the electronic device may set a broadcast identifier for each menu in the old menu list. The broadcast identifier is used to distinguish whether the menu is broadcast by the electronic device. For example, "0" and "1" may be used as broadcast identifiers of a menu. If the menu has been broadcast, the electronic device may set the broadcast identifier of the menu to "0", or otherwise, set the broadcast identifier of the menu to "1". For a new menu list, the electronic device may set all broadcast identifiers of newly added menus in the new menu list to "1".

Therefore, the electronic device may determine, by using the broadcast identifier of the focus menu, whether the focus menu is broadcast by the electronic device. If the focus menu is not broadcast by the electronic device, the electronic device automatically broadcasts the focus menu once. If the focus menu is broadcast by the electronic device, the electronic device does not automatically broadcast the focus menu.

In some embodiments, when setting the focus menu in the new menu list based on the focus menu in the old menu list, the electronic device may alternatively uniquely identify a menu by using an index value of the menu, determine an index value of the focus menu in the new menu list by using an index value of the focus menu in the old menu list, and then set a menu corresponding to the index value in the new menu list as the focus menu.

In some embodiments, regardless of whether the focus menu in the new menu list is broadcast by the electronic device before the old menu list is updated, the electronic device may not automatically broadcast the focus menu in the new menu list.

In some other embodiments, regardless of whether the focus menu in the new menu list is broadcast by the electronic device before the old menu list is updated, the electronic device may automatically broadcast the focus menu in the new menu list once.

S106: The electronic device displays the new menu list in a user interface. In the new menu list, a newly added menu is displayed after the focus menu.

It may be understood that the electronic device may obtain the new menu list in the foregoing three manners. The new menu list is then displayed in the user interface. Among the new menus obtained in each manner, the newly added menus are displayed after the focus menus in the new menu list.

For example, a new menu list obtained in the manner 1 may be the menu list 820 in the user interface 84 shown in FIG. 7*d*. The focus menu in the menu list 820 is the menu 813. Compared with the menu list 810 before updating, the newly added menus in the menu list 820 include the menu 821 to the menu 824, and these newly added menus are all displayed after the focus menu 813.

Anew menu list obtained in the manner 2 may be the menu list 920 in the user interface 93 shown in FIG. 8*c*. The focus menu in the menu list 920 is the menu 912. Compared with the menu list 910 before updating, the newly added menu in the menu list 820 includes the menu 921, and the newly added menu is displayed after the focus menu 912.

Anew menu list obtained in the manner 3 may be the menu list 830 in the user interface 86 shown in FIG. 9. The focus menu in the menu list 830 is the menu 811. Compared with the menu list 810 before updating, the newly added menus in the menu list 830 include the menu 831 to the menu 835, and these newly added menus are all displayed after the focus menu 811.

It may be understood that operation S101 only needs to be performed before operation S105.

It can be learned that, by using the menu list update method provided in embodiments of this application, when the menu list is updated, a menu following the focus menu in the new menu list is not broadcast by the electronic device. In a menu before the focus menu, if the electronic device has not broadcast the menu, the menu is not arranged between menus that have been broadcast by the electronic device. In this way, when the electronic device traverses the updated menu list, unnecessary repeated broadcasting is not caused, and the menu list can be quickly traversed to find a menu expected by the user, thereby improving user experience on using the electronic device.

In conclusion, the foregoing embodiments are merely intended for describing the technical solutions of this application, but not for limiting this application. Although this application is described in detail with reference to the foregoing embodiments, a person of ordinary skill in the art should understand that they may still make modifications to the technical solutions described in the foregoing embodiments or make equivalent replacements to some technical features thereof, without departing from the scope of the technical solutions of embodiments of this application.

According to the context, the term "when" used in the foregoing embodiments may be interpreted as a meaning of "if", "after", "in response to determining", or "in response to detecting". Similarly, according to the context, the phrase "when it is determined that" or "if (a stated condition or event) is detected" may be interpreted as "if it is determined that", "in response to determining", "when (a stated condition or event) is detected", or "in response to detecting (a stated condition or event)".

All or some of the foregoing embodiments may be implemented by using software, hardware, firmware, or any combination thereof. When software is used to implement the embodiments, all or a part of the embodiments may be implemented in a form of a computer program product. The computer program product includes one or more computer instructions. When the computer program instructions are loaded and executed on the computer, the procedure or functions according to embodiments of this application are all or partially generated. The computer may be a general-purpose computer, a dedicated computer, a computer network, or other programmable apparatuses. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive), or the like.

A person of ordinary skill in the art may understand that all or some of the processes of the methods in embodiments may be implemented by a computer program instructing relevant hardware. The program may be stored in a computer-readable storage medium. When the program runs, the processes of the methods in embodiments are performed. The foregoing storage medium includes any medium that can store program code, such as a ROM, a random access memory RAM, a magnetic disk, or an optical disc.

What is claimed is:

1. A method of updating a menu list, the method comprising:
    displaying, by an electronic device, an old menu list;
    broadcasting the old menu list, wherein an item being broadcast in the old menu list is designated as a focus menu;
    updating, by the electronic device, the old menu list, to obtain a new menu list;
    adding a newly added menu to the new menu list;
    sorting, according to a service sorting rule, the new menu list in an order based on an available menu in the old menu list and the newly added menu depending on whether the available menu has been broadcast;
    setting, by the electronic device, a focus menu in the new menu list based on the focus menu in the old menu list; and
    displaying, by the electronic device, the new menu list, wherein in the new menu list, the newly added menu is displayed after at least the focus menu in the new menu list according to the order, and the newly added menu refers to a menu that does not exist in the old menu list but exists in the new menu list.

2. The method according to claim 1, wherein
    in the new menu list, a newly added menu sorted according to a service sorting rule is displayed after an available menu, and the available menu refers to a menu that exists in both the old menu list and the new menu list.

3. The method according to claim 2, wherein the updating, by the electronic device, the old menu list, to obtain a new menu list comprises:
    placing, by the electronic device, an ordered newly-added list after an old available list to obtain the new menu list, wherein the old available list refers to a set of available menus, and the ordered newly-added list refers to a set of newly added menus sorted according to the service sorting rule.

4. The method according to claim 1, wherein
    when the focus menu in the old menu list is an unavailable menu, in the new menu list, both an available menu after the focus menu in the old menu list and a newly added menu sorted according to a service sorting rule are displayed after an available menu that is before the focus menu in the old menu list; or
    when the focus menu in the old menu list is an available menu, in the new menu list, both an available menu after the focus menu in the old menu list and a newly added menu sorted according to a service sorting rule are displayed after the focus menu in the old menu list and an available menu that is before the focus menu in the old menu list.

5. The method according to claim 4, wherein the updating, by the electronic device, the old menu list, to obtain a new menu list comprises:
    when the focus menu in the old menu list is an unavailable menu, placing, by the electronic device, an ordered post-focus list after a pre-focus old list, to obtain the new menu list, wherein the ordered post-focus list refers to a set comprising both the available menu after the focus menu in the old menu list and the newly added menu sorted according to the service sorting rule, and the pre-focus old list is a set of available menus before the focus menu in the old menu list; or when the focus menu in the old menu list is an available menu, placing, by the electronic device, an ordered post-focus list after a pre-focus old list, to obtain the new menu list, wherein the ordered post-focus list refers to a set comprising both the available menu after the focus menu in the old menu list and the newly added menu sorted according to the service sorting rule, and the pre-focus old list refers to a set comprising the focus menu in the old menu list and the available menu before the focus menu in the old menu list.

6. The method according to claim 1, wherein the updating, by the electronic device, the old menu list, to obtain a new menu list comprises:

placing, by the electronic device, an ordered unbroadcast list after a broadcast old list, to obtain the new menu list, wherein the ordered unbroadcast list refers to a set comprising both the available menu that is in the old menu list and that is not broadcast by the electronic device and the newly added menu sorted according to the service sorting rule, and the broadcast old list refers to a set of available menus that are broadcast by the electronic device.

7. The method according to claim 2, wherein the setting, by the electronic device, a focus menu in the new menu list based on a focus menu in the old menu list specifically comprises:

when the electronic device determines that the focus menu in the old menu list is a non-unavailable menu, setting, by the electronic device, the focus menu in the new menu list to be the same as the focus menu in the old menu list; or when the electronic device determines that the focus menu in the old menu list is an unavailable menu, and there is a non-unavailable menu after the focus menu in the old menu list, setting, by the electronic device, a first non-unavailable menu after the focus menu in the old menu list as the focus menu in the new menu list; or when the electronic device determines that the focus menu in the old menu list is an unavailable menu, and there is no non-unavailable menu after the focus menu in the old menu list, setting, by the electronic device, a first menu in the new menu list as the focus menu.

8. The method according to claim 2, wherein the setting, by the electronic device, a focus menu in the new menu list based on a focus menu in the old menu list specifically comprises:

when the electronic device determines that the focus menu in the old menu list is an available menu, setting, by the electronic device, the focus menu in the new menu list to be the same as the focus menu in the old menu list; or when the electronic device determines that the focus menu in the old menu list is an unavailable menu, and there is an available menu before the focus menu in the old menu list, setting, by the electronic device, a first available menu before the focus menu in the old menu list as the focus menu in the new menu list; or when the electronic device determines that the focus menu in the old menu list is an unavailable menu, and there is no non-unavailable menu before the focus menu in the old menu list, setting, by the electronic device, a first menu in the new menu list as the focus menu.

9. The method according to claim 4, wherein the setting, by the electronic device, a focus menu in the new menu list based on a focus menu in the old menu list specifically comprises:

when the electronic device determines that the focus menu in the old menu list is an available menu, setting, by the electronic device, the focus menu in the new menu list to be the same as the focus menu in the old menu list; or when the electronic device determines that the focus menu in the old menu list is an unavailable menu, and there is an available menu before the focus menu in the old menu list, setting, by the electronic device in the new menu list, a first menu that is not before the focus menu in the old menu list as the focus menu; or when the electronic device determines that the focus menu in the old menu list is an unavailable menu, and there is no non-unavailable menu before the focus menu in the old menu list, setting, by the electronic device, a first menu in the new menu list as the focus menu.

10. The method according to claim 1, wherein the setting, by the electronic device, a focus menu in the new menu list based on a focus menu in the old menu list specifically comprises:

when the electronic device determines that the focus menu in the old menu list is an available menu, setting, by the electronic device, the focus menu in the new menu list to be the same as the focus menu in the old menu list; or when the electronic device determines that the focus menu in the old menu list is an unavailable menu, and there is an available menu that is broadcast by the electronic device before the focus menu in the old menu list, setting, by the electronic device, a first available menu that is broadcast by the electronic device before the focus menu in the old menu list as the focus menu in the new menu list; or when the electronic device determines that the focus menu in the old menu list is an unavailable menu, and there is no available menu that is broadcast by the electronic device before the focus menu in the old menu list, setting, by the electronic device, a first menu in the new menu list as the focus menu.

11. The method according to claim 1, wherein the setting, by the electronic device, a focus menu in the new menu list based on a focus menu in the old menu list specifically comprises:

when the electronic device determines that the focus menu in the old menu list is an available menu, setting, by the electronic device, the focus menu in the new menu list to be the same as the focus menu in the old menu list; or when the electronic device determines that the focus menu in the old menu list is an unavailable menu, and there is an available menu that is broadcast by the electronic device before the focus menu in the old menu list, setting, by the electronic device in the new menu list, a first menu that is not before the focus menu in the old menu list as the focus menu; or when the electronic device determines that the focus menu in the old menu list is an unavailable menu, and there is no available menu that is broadcast by the electronic device before the focus menu in the old menu list, setting, by the electronic device, a first menu in the new menu list as the focus menu.

12. The method according to claim 1, wherein the method further comprises:
when the focus menu in the new menu list is not broadcast by the electronic device before the old menu list is updated, automatically broadcasting, by the electronic device, the focus menu in the new menu list once; or
when the focus menu in the new menu list is broadcast by the electronic device before the old menu list is updated, skipping, by the electronic device, automatically broadcasting the focus menu in the new menu list.

13. The method according to claim 1, wherein the method further comprises:
automatically broadcasting, by the electronic device, the focus menu in the new menu list once.

14. The method according to claim 1, wherein the method further comprises:
skipping, by the electronic device, automatically broadcasting the focus menu in the new menu list.

15. An electronic device, comprising:
one or more processors; and
a memory, wherein the memory is coupled to the one or more processors and is configured to store computer program code that includes computer instructions, and wherein the one or more processors invoke the computer instructions, so that the electronic device performs:
displaying an old menu list;
broadcast the old menu list, wherein an item being broadcast in the old menu list is designated as a focus menu;
updating the old menu list, to obtain a new menu list;
add a newly added menu to the new menu list;
sort, according to a service sorting rule, the new menu list in an order based on an available menu in the old menu list and the newly added menu depending on whether the available menu has been broadcast;
setting a focus menu in the new menu list based on the focus menu in the old menu list; and
displaying the new menu list, wherein in the new menu list, the newly added menu is displayed after at least the focus menu in the new menu list according to the order, and the newly added menu refers to a menu that does not exist in the old menu list but exists in the new menu list.

16. The electronic device according to claim 15, wherein
when the focus menu in the old menu list is an unavailable menu, in the new menu list, both an available menu after the focus menu in the old menu list and a newly added menu sorted according to a service sorting rule are displayed after an available menu that is before the focus menu in the old menu list; or
when the focus menu in the old menu list is an available menu, in the new menu list, both an available menu after the focus menu in the old menu list and a newly added menu sorted according to a service sorting rule are displayed after the focus menu in the old menu list and an available menu that is before the focus menu in the old menu list.

17. The electronic device according to claim 15, wherein
in the new menu list, both an available menu that is in the old menu list and that is not broadcast and a newly added menu sorted according to a service sorting rule are displayed after an available menu that is in the old menu list and that is already broadcast.

18. A computer-readable storage medium, comprising instructions, wherein when the instructions are run on an electronic device, the electronic device is to:
display an old menu list;
broadcast the old menu list, wherein an item being broadcast in the old menu list is designated as a focus menu;
update the old menu list, to obtain a new menu list;
add a newly added menu to the new menu list;
sort, according to a service sorting rule, the new menu list in an order based on an available menu in the old menu list and the newly added menu depending on whether the available menu has been broadcast;
set a focus menu in the new menu list based on the focus menu in the old menu list; and
display the new menu list, wherein in the new menu list, the newly added menu is displayed after at least the focus menu in the new menu list according to the order, and the newly added menu refers to a menu that does not exist in the old menu list but exists in the new menu list.

* * * * *